United States Patent [19]

Skeels, Gary W. et al.

[11] Patent Number: 4,836,911

[45] Date of Patent: Jun. 6, 1989

[54] HYDROCARBON CONVERSION USING SILICON-SUBSTITUTED ZEOLITE COMPOSITIONS

[75] Inventors: Skeels, Gary W., Brewster; Donald W. Breck, deceased, late of White Plains; by Stephen R. Breck, heir, New York, all of N.Y.; by George D. Breck, heir, Sebastopol, Calif.

[73] Assignee: UOP, Des Plains, Ill.

[21] Appl. No.: 880,016

[22] Filed: Jun. 30, 1986

Related U.S. Application Data

[60] Division of Ser. No. 700,894, Feb. 12, 1985, abandoned, which is a continuation-in-part of Ser. No. 315,853, Oct. 28, 1981, Pat. No. 4,503,023, and a continuation-in-part of Ser. No. 476,780, Mar. 18, 1983, abandoned, which is a continuation of Ser. No. 315,853, Oct. 28, 1981, Pat. No. 4,503,023, which is a continuation-in-part of Ser. No. 66,330, Aug. 14, 1979, abandoned.

[51] Int. Cl.⁴ ............................................. C10G 47/02
[52] U.S. Cl. ..................................... 208/111; 208/120; 208/134; 208/264; 585/467; 585/481; 585/722; 585/739
[58] Field of Search ............... 208/111, 120, 134, 264; 585/467, 481, 739, 722

[56] References Cited

U.S. PATENT DOCUMENTS 3,236,762  2/1966  Rabo et al. ........................... 585/467
4,016,246  4/1977  Whittam .............................. 423/329

Primary Examiner—Curtis R. Davis
Attorney, Agent, or Firm—Richard G. Miller

[57] ABSTRACT

Crystalline zeolitic aluminosilicates having at least some of its original framework aluminum atoms replaced by extraneous silicon atoms and having a mole ratio of oxides in the dehydrated state of $$(0.85-1.1)M_{2/n}O: Al_2O_3: xSiO_2$$

wherein M is a cation having a valence of "n"; "x" has a value greater than 6.0; has an x-ray powder diffraction pattern having at least the d-spacings of Table A; and has extraneous silicon atoms in the crystal lattice in the form of framework SiO₄ tetrahedra. These novel zeolite aluminosilicates are employed in hydrocarbon conversion processes.

19 Claims, 3 Drawing Sheets

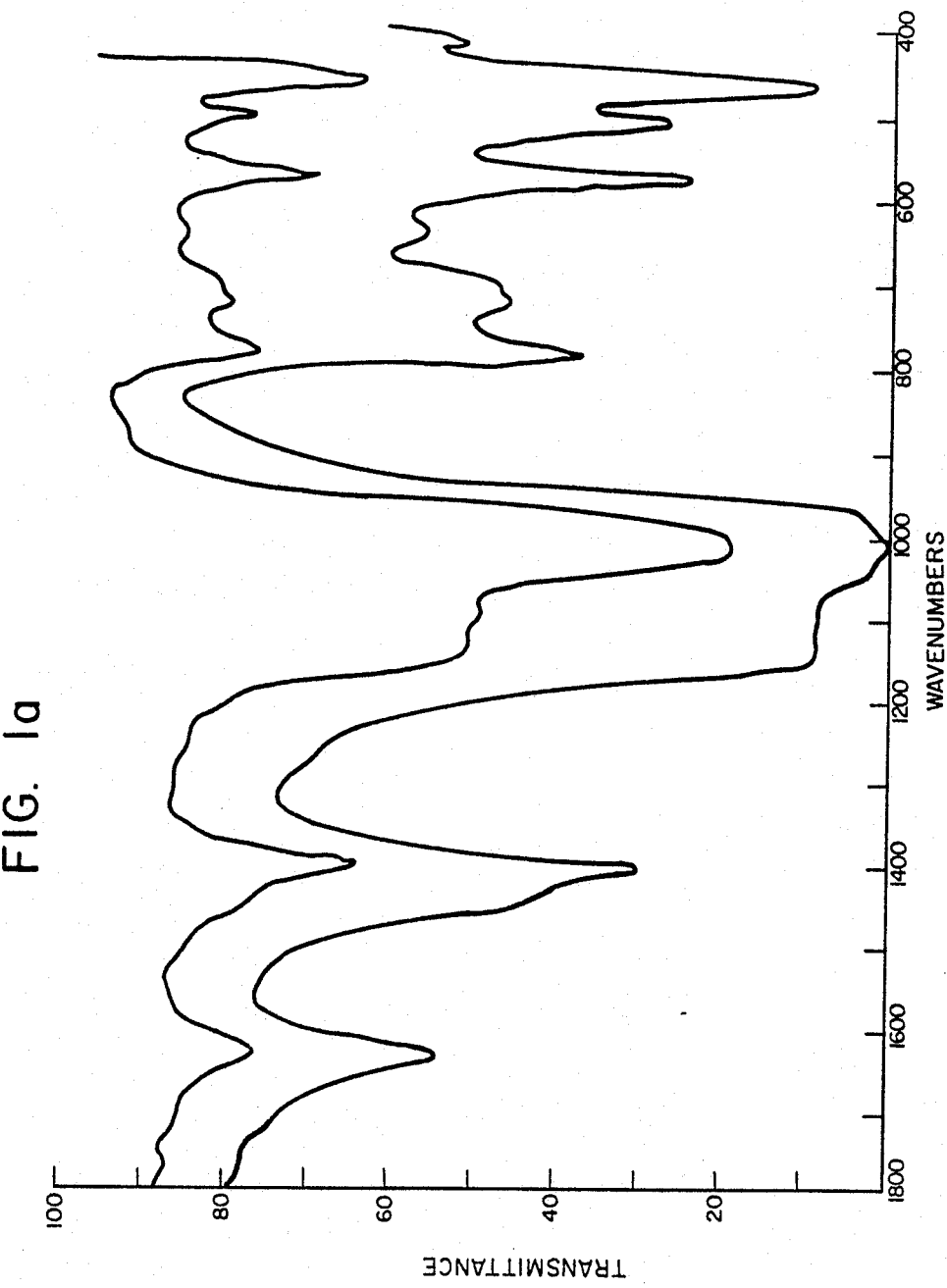

HYDROCARBON CONVERSION USING SILICON-SUBSTITUTED ZEOLITE COMPOSITIONS

CROSS REFERENCE TO RELATED APPLICATIONS

This application division of prior U.S. application Ser. No. 700,894 filed 2/12/85 now abandoned and/ which is a continuation-in-part of U.S. Ser. No. 315,853, filed Oct. 28, 1981, now U.S. Pat. No. 4,503,023, and, further, is a continuation-in-part of U.S. Ser. No. 476,780, filed Mar. 18, 1983, now abandoned, which is a continuation application of Ser. No. 315,853, filed Oct. 28, 1981, now U.S. Pat. No. 4,503,023, which is a continuation-in-part of application U.S. Ser. No. 066,330, filed Aug. 14, 1979, now abandoned.

FIELD OF THE INVENTION

The instant invention relates to novel zeolite compositions topologically related to zeolite Y but which have $SiO_2/Al_2O_3$ molar ratios greater than that heretofore known for synthesized zeolite Y.

The instant invention relates in general to novel zeolite compositions. More particularly it relates to zeolite compositions topologically related to zeolite Y but having greater $SiO_2/Al_2O_3$ molar ratios than heretofore known for zeolite Y and characterized by containing framework silicon atoms from an extraneous source, and preferably a very low content of defect sites in the structure. In general such zeolites are prepred by contacting the starting zeolite Y under controlled conditions with an aqueous solution of a fluorosilicate salt, preferably one which does not form insoluble salts with aluminum.

BACKGROUND OF THE INVENTION

The crystal structures of naturally occurring and as-synthesized zeolitic aluminosilicates are composed of $AlO_4^-$ and $SiO_4$ tetrahedra which are cross-lined by the sharing of oxygen atoms. The electrovalence of each tetrahedron containing an aluminum atom is balanced by association with a cation. Most commonly this cation is a metal cation such as $Na^+$ or $K^+$ but organic species such as quaternary ammonium ions are also employed in zeolite synthesis and in some instances appear as cations in the synthesized zeolite product. In general the meal cations are, to a considerable extend at least, replaceable with other cations including $H^+$ and $NH_4^+$. In many instances the organic cation species are too large to pass through the pore system of the zeolite and hence cannot be directly replaced by ion exchange techniques. Thermal treatments can reduce these organic cations to $H^+$ or $NH_4^+$ cations which can be directly ion-exchanged. Thermal treatment of the $H^+$ or $NH_4^+$ cationic forms of the zeolites can result in the substantial removal of these cations from their normal association with the $AlO_4^-$ tetrahedra thereby creating an electrovalent imbalance in the zeolite structure which must be accompanied by structural rearrangements to restore the electrovalent balance. Commonly when the $AlO_4^-$ tetrahedra constitute about 40% or more of the total framework tetrahedra, the necessary structural rearrangements cannot be accommodated and the crystal structure collapses. In more siliceous zeolites, the structural integrity is substantially maintained but the resulting "decationized" form has certain significantly different properties from its fully cationized precursor.

The relative instability of aluminum in zeolites, particularly in the non-metallic cationic or the decationized form, is well recognized in the art. For example, in U.S. Pat. No. 3,640,681, issued to P. E. Pickert on Feb. 3, 1972, there is disclosed a process for extracting framework aluminum from zeolites which involves dehydroxylating a partially cation deficient form of the zeolite and then contacting it with acetylacetone of a metal derivative thereof to chelate and solubilize aluminum atoms. Ethylenediaminetetraacetic acid has been proposed as an extractant for aluminum from a zeolite framework in a process which is in some respects similar to the Pickert process. It is also known that calcining the $H^+$ or $NH_4^+$ cation forms of zeolites such as zeolite Y in an environment of water vapor, either extraneous or derived from dehydroxylation of the zeolite itself, is effective in removing framework aluminum by hydrolysis. Evidence of this phenomenon is set forth in U.S. Pat. No. 3,506,400, issued Apr. 14, 1970 to P. E. Eberly, Jr. et al., U.S. Pat. No. 3,493,519, issued Feb. 3, 1970 to G. T. Kerr et al., and U.S. Pat. No. 3,513,108, issued May 19, 1970 to G. T. Kerr. In those instances in which the crystal structure of the product composition is retained after the rigorous hydrothermal treatment involved, infrared analysis indicated the presence of substantial hydroxyl groups exhibiting a stretching frequency in the area of about 3740, 3640 and 3550 cm$^{-1}$. The infrared analytical data of U.S. Pat. No. 3,506,400 is especially instructive in this regard. An explanation of the mechanism of the creation of these hydroxyl groups is provided by Kerr et al in U.S. Pat. No. 3,493,519 wherein the patentees state the aluminum atoms in the lattice framework of hydrogen zeolites can react with water resulting in the removal of aluminum from the lattice in accordance with the following equation:

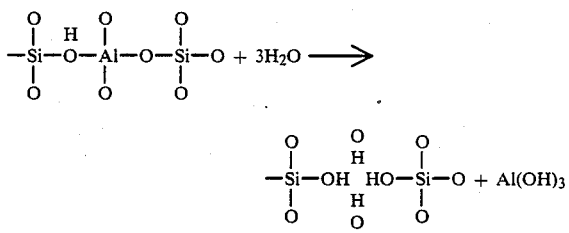

The aluminum removed from its original lattice position is capable of further reaction with cationic hydrogen, according to Kerr et. al. to yield aluminum-containing i.e. hydroxo-aluminum, cations by the equation:

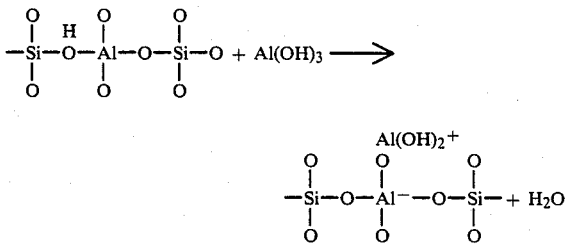

It has been suggested that stabilization of $NH_4Y$ occurs through hydrolysis of sufficient framework aluminum to form stable clusters of these hydroxoaluminum cations within the sodalite cages, thereby holding the zeolite structure together while the framework anneals itself through the migration of some of the framework silicon atoms.

It is alleged in U.S. Pat. No. 3,594,331, issued July 20, 1971 to C. H. Elliott, that fluoride ions in aqueous media, paticularly under conditions in which the pH is less than about 7, are quite effective in extracting framework aluminum from zeolite lattices, and in fact when the fluoride concentration exceeds about 15 grams active fluoride per 10,000 grams of zeolite, destruction of the crystal lattice by the direct attack on the framework silicon as well as on the framework aluminum can result. A fluoride treatment of this type using from 2 to 22 grams of available fluoride per 10,000 grams of zeolite (anhydrous) in which the fluroide is provided by ammonium fluorosilicate is also described therein. The treatment is carried out for the purpose of improving the thermal stability of the zeolite. It is theorized by the patentee that the fluoride in some manner becomes attached to the constructional alkali metal oxide, thereby reducing the fluxing action of the basic structural Na$_2$O which would otherwise result in the collapse of the crystal structure. Such treatment within the constraints of the patent disclosure has no effect on either the overall silicon content of the zeolite product or the silicon content of a unit cell of the zeolite.

Since the stability quite obviously is, in part at least, a function of the SiO$_2$/Al$_2$O$_3$ ratio of zeolites, it would appear to be advantageous to obtain zeolites having higher proportions of SiO$_4$ tetrahedra by direct synthesis techniques and thereby avoid the structural changes inherent In framework aluminum extraction. Despite considerable effort in this regard, however, only very modest success has been achieved, and this is applied to a few individual species only. For example, over the twenty year period since zeolite Y was first made known to the public as a species having an as-synthesized SiO$_2$/Al$_2$O$_3$ molar ratio of 3 to 6, the highest SiO$_2$/Al$_2$O$_3$ value alleged for an as-synthesized zeolite having the Y structure to date is 7.8 (Netherlands Pat. No. 7306078 and U.S. Pat. No. 1,431,944). In the case of the later allegedly high SiO$_2$/Al$_2$O$_3$(Si/Al$_2$) ratio materials, it is apparent that calcination of the prepared zeolites prior to the determination of the $a_o$ for the zeolite accounts for the estimated high SiO$_2$/Al$_2$O$_3$ values.

The instant invention relates to novel zeolite compositions topologically related to zeolite Y but having greater SiO$_2$/Al$_2$O$_3$ molar ratios than heretofore known for directly synthesized zeolite Y and characterized as containing framework silicon atoms from an extraneous source, and, preferably, are also characterized by a very low content of defect sites in the structure, as hereinafter discussed.

DESCRIPTION OF FIGURES

FIG. 1a and 1b depict the infrared spectra of an NH$_4$Y and an LZ-210, respectively.

SUMMARY OF THE INVENTION

Figure 1B:
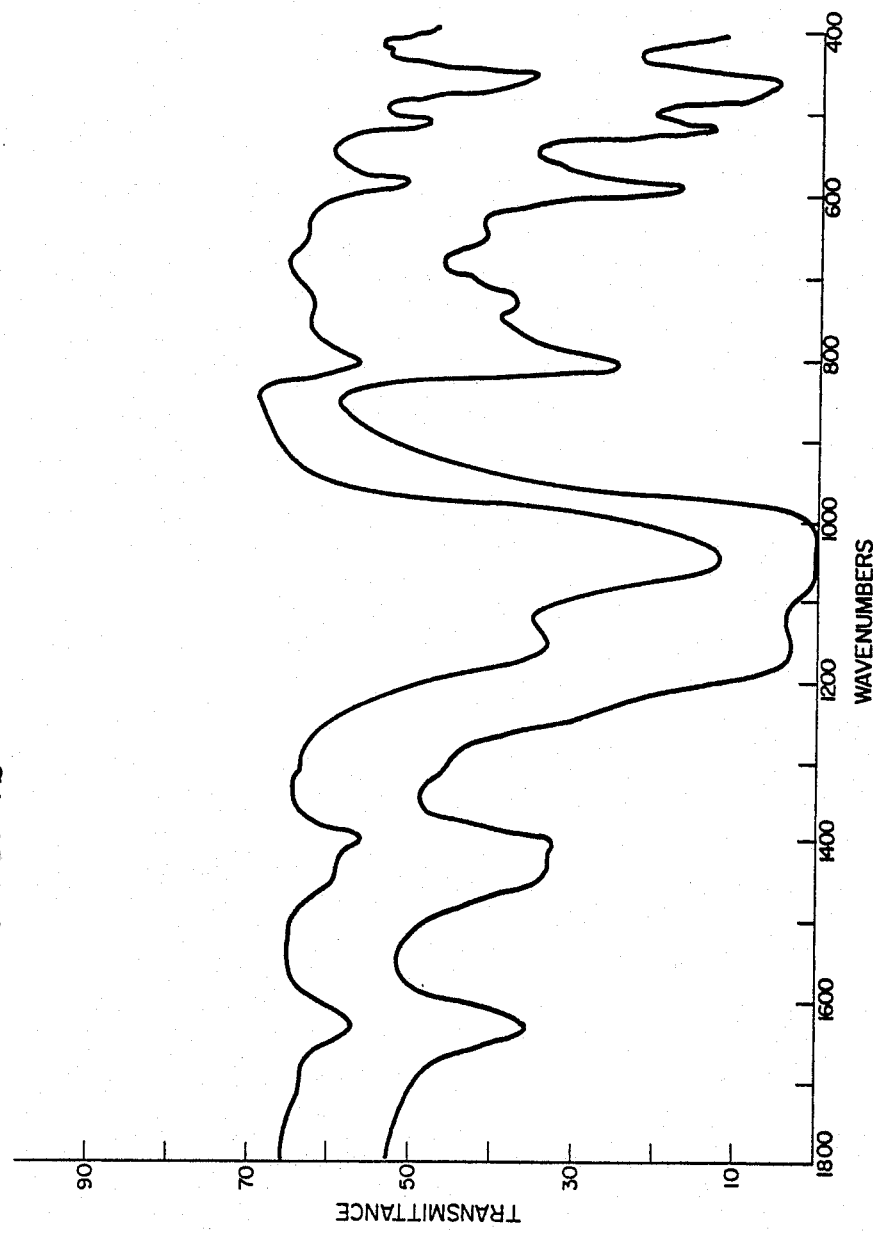

The instant invention relates to aluminosilicates having in the anydrous state a chemical composition expressed in terms of mole ratios of oxides as:

$$(0.85-1.1)M_{2/n}O:Al_2O_3:xSiO_2$$

wherein "M" is a cation having a valence "n"; and "x" has a value greater than 6; having an x-ray powder diffraction pattern having at least the d-spacings set forth in Table A, below, and having extraneous silicon atoms in its crystal lattice in the form of SiO$_4$ tetrahedra, preferably in an average amount of at least 1.0 per 10,000 Å$^3$

DISCUSSION OF THE INVENTION

The instant invention relates to aluminosilicates having in the anydrous state a chemical composition expressed in terms of mole ratios of oxides as $$(0.85-1.1)M_{2/n}O:Al_2O_3:xSiO_2$$

wherein "M" is a cation having the valence "n"; and "x" has a value greater than 6; having an X-ray powder diffraction pattern having at least the d-spacings set forth in Table A, below; and having extraneous silicon atoms in its crystal lattice in the form of SiO$_4$ tetrahedra, preferably in an average amount of at least 1.0 per 10,000Å$^3$. In a further embodiment the value of "x" is greater than 8.0. These aluminosilicates are derived from zeolite Y and are topologically related to zeolite Y. The zeolites of the instant invention will be referred to herein, solely for the purpose of reference, as "LZ-210".

For purposes of reference herein the framework composition is best expressed in terms of mole fractions of framework tetrahedra TO$_2$. The starting zeolite Y may be expressed as:

$$(Al_aSi_b\square_z)O_2$$

wherein "a" is the mole fraction of aluminum tetrahedra in the framework; "b" is the mole fraction of silicon tetrahedra in the framework; $\square$ denotes defect sites and "z" is the mole fraction of defect sites in the zeolite framework. In many cases the "z" value for the starting zeolite is zero and the defect sites are simply eliminated from the expression. Numerically the sum of the values a+b+z=1.

The zeolite product, i.e., LZ-210, of the fluorosilicate treatment, expressed in terms of mole fraction of framework tetrahedra (TO$_2$) will have the form $$[Al_{a-N}Si_{b+(N-\Delta z)}\square_z]O_2$$

wherein: "N" is defined as the mole fraction of aluminum tetrahedra removed from the framework during the treatment; "a" is the mole fraction of aluminum tetrahedra present in the framework of the starting zeolite; "b" is the mole fraction of silicon tetrahedra present in the framework of the starting zeolite; "z" is the mole fraction of defect sites in the framework; (N-$\Delta z$) is the mole fraction increase in silicon tetrahedra resulting from the fluorosilicate treatment; "$\Delta z$" is the net change in the mole fraction of defect sites in the zeolite framework resulting from the treatment, wherein:

$$\Delta z = z(\text{product zeolite}) - z(\text{starting zeolite}).$$

The term "Defect Structure Factor" for any given zeolite is equivalent to the "z" value of the zeolite and is further discussed hereinafter. The net change in Defect Structure Factors between the starting zeolite and the product zeolite is equivalent to "$\Delta z$". Numerically, the sum of the values:

$$(a-N)+[b+(N-\Delta z)]+z=1$$

A subclass of the above LZ-210 compositions, i.e., those which are characterized by having both high molar $SiO_2/Al_2O_3$ ratios and low Defect Structure Factors (as hereinafter discussed), can be defined as having a chemical composition expressed in terms of mole fractions of framework tetrahedra as:

$$[Al_{(a-N)}Si_{b+(N-\Delta z)}\Box_z]O_2$$

wherein: the mole fraction of aluminum removed from the framework of the starting zeolite is "N";

$$\frac{b+(N-\Delta z)}{a-N}$$

has a value greater than 3; the change in defect structure factor $\Delta z$ is less than 0.08 and preferably less than 0.05; an increased silicon content in the framework, $$\frac{(N-\Delta z)}{N},$$

of at least 0.5; and a cation equivalent expressed as a monovalent cation species, $M^+/Al$, from 0.85 to 1.1 and the characteristic crystal structure of zeolite Y as indicated by an X-ray powder diffraction pattern having at least the d-spacings set forth broadly in Table A.

TABLE A

| d(A) | Intensity |
| --- | --- |
| 14.22–13.97 | very strong |
| 8.71–8.55 | medium |
| 7.43–7.30 | medium |
| 5.66–5.55 | strong |
| 4.75–4.66 | medium |
| 4.36–4.28 | medium |
| 3.75–3.69 | strong |
| 3.30–3.23 | strong |
| 2.85–2.79 | strong |

In a further embodiment of the above LZ-210 compositions such have the characteristic crystal structure as indicated by an x-ray powder diffraction pattern having at least the d-spacings set forth in Table B.

TABLE B

| d(A) | Intensity |
| --- | --- |
| 14.210–14.155 | very strong |
| 8.705–8.670 | medium |
| 7.420–7.395 | medium |
| 5.650–5.625 | strong |
| 4.740–4.720 | medium |
| 4.350–4.335 | medium |
| 3.755–3.740 | strong |
| 3.290–3.275 | strong |
| 2.845–2.830 | strong |

Zeolite LZ-210 as defined above will have a cubic unit cell dimension, $a_o$, of less than 24.61 Angstroms, preferably from 24.20 to 24.61 Angstroms and an oxygen adsorption capacity at 100 Torr and $-183°$ C. of at least 25 weight percent. In a further embodiment the $a_o$ is from 24.52 to 24.61 Angstroms and an adsorption capacity for water vapor at 25° C. and 4.6 Torr water vapor pressure of at least 20 weight persent based on the anhydrous weight of the zeolite, and preferably an oxygen adsorption capacity at 100 Torr and $-183°$ C. at least 25 weight percent.

In a further embodiment LZ-210 is characterized as having, in the anhydrous state, a chemical composition expressed in terms of mole ratios of oxides as $$(0.85-1.1)M_{2/n}O:Al_2O_3:xSiO_2$$

wherein "M" is a cation having the valence "n" and "x" is a value greater than 8, preferably greater than 9 more preferably and within the range of 9 to 60, having an x-ray powder diffraction pattern having at least the d-spacings set forth in Table C, below and having extraneous silicon atoms in its crystal lattice in the form of $SiO_4$ tetrahedra, preferably in an average amount of at least 1.0 per 10,000$A^3$. Another subclass of LZ-210 compositions, i.e., those which are characterized by having both high molar $SiO_2/Al_2O_3$ ratios and low Defect Structure Factors, can be defined as having a chemical composition expressed in terms of mole fractions of framework tetrahedra as:

$$[Al_{(a-N)}Si_{b+(N-\Delta z)}\Box_z]O_2$$

wherein: the mole fraction of aluminum, N, removed from the framework of the starting zeolite is at least 0.03a;

$$\frac{b+(N-\Delta z)}{a-N}$$

has a value $\geq 4$ and preferably greater than 4.5; the change in defect structure factor $\Delta z$ is less than 0.08 and preferably less than 0.05; an increased silicon content in the framework, $$\frac{(N-\Delta z)}{N},$$

of at least 0.5; and a cation equivalent expressed as a monovalent cation species, $M^+/Al$, from 0.85 to 1.1 and the characteristic crystal structure of zeolite Y has indicated by an X-ray powder diffraction pattern having at least the d-spacings set forth broadly in Table C, and more narrowly in Table D, below.

TABLE C

| d(A) | Intensity |
| --- | --- |
| 14.17–13.97 | very strong |
| 8.68–8.55 | medium |
| 7.40–7.30 | medium |
| 5.63–5.55 | strong |
| 4.72–4.66 | medium |
| 4.34–4.28 | medium |
| 3.74–3.69 | strong |
| 3.28–3.23 | strong |
| 2.83–2.79 | strong |

TABLE D

| d(A) | Intensity |
| --- | --- |
| 14.17–14.09 | very strong |
| 8.68–8.62 | medium |
| 7.40–7.35 | medium |
| 5.63–5.59 | strong |
| 4.72–4.69 | medium |
| 4.34–4.31 | medium |
| 3.74–3.72 | strong |
| 3.28–3.26 | strong |
| 2.83–2.81 | strong |

The LZ-210 zeolite as defined above for "x" greater than 8 and $$\frac{b + (N - \Delta z)}{a - N}$$

of at least 4 will have a cubic unit cell dimension, $a_o$, of less than 24.55 Angstroms, preferably from 24.20 to 24.55 Angstroms and, when the molar $SiO_2/Al_2O_3$ ratio is less than 20, an adsorption capacity for water vapor at 25° C. and 4.6 Torr water vapor pressure of at least 20 weight percent based on the anhydrous weight of the zeolite, and preferably an oxygen adsorption capacity at 100 Torr and −183° C. of at least 25 weight percent.

LZ-210 can be prepared by a method which removes framework aluminum from a zeolite having $SiO_2/Al_2O_3$ molar ratios of about 3 or greater and substituting therefor silicon from a source extraneous to the starting zeolite. By such a procedure it is possible to create more highly siliceous zeolite species which have the same crystal structure as would result by direct synthesis if such synthesis method were known. The process disclosed in copending U.S. Ser. No. 315,853 comprises contacting a crystalline zeolite having pore diameters of at least about 3 Angstroms and having a molar $SiO_2/Al_2O_3$ ratio of at least 3, with a fluorosilicate salt, preferably in an amount of at least 0.0075 moles per 100 grams of zeolite starting material, said flurosilicate salt being in the form of an aqueous solution or slurry having a pH value in the range of 3 to about 7, preferably 5 to about 7, and brought into contact with the zeolite either incrementally or continuously at a slow rate whereby framework aluminum atoms of the zeolite are removed and replaced by extraneous silicon atoms from the added fluorosilicate.

LZ-210 can be prepared from a conventionally prepared zeolite Y which has a molar $SiO_2/Al_2O_3$ ratio of less than 6 by using the above process to increase the $SiO_2/Al_2O_3$ ratio to a value greater than 6. A preferred procedure comprises:

(a) providing a zeolite Y composition having a molar $SiO_2/Al_2O_3$ ratio less than that of the final product;

(b) contacting and reacting at a temperature of from 20° to 95° C., said zeolite Y with a fluorosilicate, preferably ammonium fluorosilicate. The fluorosilicate solution, being in the form of an aqueous solution or slurry at a pH in the range of 5 to about 7, is brought into contact with the zeolite either incrementally or continuously at a slow rate such that a sufficient proportion of the framework aluminum atoms removed are replaced by silicon atoms to retain at least 80 percent, preferably at least 90 percent, of the crystal structure of the starting zeolite Y; and (c) isolating the zeolite having an enhanced framework silicon content from the reaction mixture.

The starting zeolite Y comoposition can be synthesized by any of the processes well known in the art. A representative process is disclosed in U.S. Pat. No. 3,130,007.

For reasons more fully explained hereinafter, it is necessary that the starting zeolite be able to withstand the initial loss of framework aluminum atoms to at least a modest degree without collapse of the crystal structure unless the process is to be carried out at a very slow pace. Accordingly it is preferred that the $SiO_2/Al_2O_3$ ratio of the starting zeolite be at least 3.0. Also it is preferred that at least about 50, more preferably at least 95%, of the $AlO_4^-$ tetrahedra of the naturally occurring or as-synthesized zeolite are present in the starting zeolite. Most advantageously the starting zeolite contains as many as possible of its original $AlO_4^-$ tetrahedra, i.e., has not been subjected to any post-formation treatment which either extensively removes aluminum atoms from their original framework sites or converts them from the normal conditions of 4-fold coordination with oxygen.

The cation population of the starting zeolite is not critical factor insofar as substitution of silicon for framework aluminum is concerned, but since the substitution mechanism involves the in situ formation of salts of at least some of the zeolitic cations, it is advantageous that these salts be water-soluble to a substantial degree to facilitate their removal from the silica-enriched zeolite product. It is found that ammonium cations form the most soluble salt in this regard and it is accordingly preferred that at least 50 percent, more preferably 85 or more percent, of the zeolite cations be ammonium cations. Sodium and potassium, two of the most common original cations in zeolites are found to form $Na_3AlF_6$ and $K_3AlF_6$ respectively, both of which are only very sparingly soluble in either hot or cold water. When these compounds are formed as precipitates within the structural cavities of the zeolite they are quite difficult to remove by water washing. Their removal, moreover, is important if thermal stability of the zeolite product is desired since substantial amounts of fluoride can cause crystal collapse at temperatures as low as 500° C.

The fluorosilicate salt used as the aluminum extractant and also as the source of extraneous silicon which is inserted into the zeolite structure in place of the extracted aluminum can be any of the fluorosilicate salts having the general formula

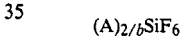

wherein A is preferably a metallic or non-metallic cation other than H+ having the valence "b". Cations represented by "A" are alkylammonium, $NH_4^+$, $H^+$, $Mg^{++}$, $Li^+$, $Na^+$, $K^+$, $Ba^{++}$, $Cd^{++}$, $Cu^+$, $Cu^{++}$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$ and $Zn^{++}$. The ammonium cation form of the fluorosilicate is highly preferred because of its substantial solubility in water and also because the ammonium cations form water soluble by-product salts upon reaction with the zeolite, namely $(NH_4)_3AlF_6$.

In certain respects, the manner in which the fluorosilicate and starting zeolite are brought into contact and the overall process of substituting silicon for aluminum in the zeolite framework is a two step process in which the aluminum extraction step will, unless controlled, proceed very rapidly while the silicon insertion is relatively slow. If dealumination becomes too extensive without silicon substitution, the crystal structure becomes seriously degraded and ultimately collapses. While we do not wish to be bound by any particular theory, it appears that the fluoride ion is the agent for the extraction of framework aluminum in accordance with the equation

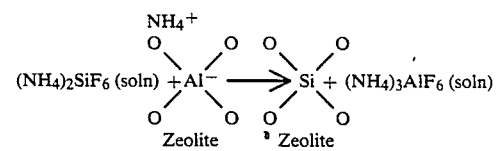

It is, therefore, essential that the initial dealumination step be inhibited and the silicon insertion step be promoted to achieve the desired zeolite product. It is found that the various zeolite species have varying degrees of resistance toward degradation as a consequence of framework aluminum extraction without silicon substitution. In general the rate of aluminum extraction is decreased as the pH of the fluorosilicate solution in contact with the zeolite is increased within the range of 3 to 7, and as the concentration of the fluorosilicate in the reaction system is decreased. Also, increasing the reaction temperature tends to increase the rate of silicon substitution. Whether it is necessary or desirable to buffer the reaction system or strictly limit the fluorosilicate concentration is readily determined for each zeolite Y species by routine observation.

Theoretically, there is no lower limit for the concentration of fluorosilicate salt in the aqueous solution employed, provided of course the pH of the solution is high enough to avoid undue destructive acidic attack on the zeolite Y structure apart from the intended reaction with the fluorosilicate. Very slow rates of addition of fluorosilicate salts insure that adequate time is permitted for the insertion of silicon as a framework substitute for extracted aluminum before excessive aluminum extraction occurs with consequent collapse of the crystal structure. Practical commercial considerations, however, require that the reaction proceed as rapidly as possible, and accordingly the conditions of reaction temperature and reagent concentrations should be optimized with respect to each zeolite Y starting material. In general the more highly siliceous the Y zeolite, the higher the permissible reaction temperature and the lower the suitable pH conditions. In general the preferred reaction temperature is within the range of 50° to 95° C., but temperatures as high as 125° C. and as low as 20° C. have been suitably employed in some instances. At pH values below about 3, crystal degradation is generally found to be unduly severe, whereas at pH values higher than 7, silicon insertion is unduly slow. The maximum concentration of fluorosilicate salt in the aqueous solution employed is, of course, interdependent with the temperature and pH factors and also with the time of contact between the zeolite and the solution and the relative proportions of zeolite and fluorosilicate. Accordingly, it is possible that solutions having fluorosilicate concentrations of from about $10^{-3}$ moles per liter of solution up to saturation can be employed, but it is preferred that concentrations in the range of 0.5 to 1.0 moles per liter of solution be used. These concentration values are with respect to true solutions, and are not intended to apply to the total fluorosilicate in slurries of salts in water. As illustrated hereinafter, even very slightly soluble fluorosilicates can be slurried in water and used as a reagent, the undissolved solids being readily available to replace dissolved molecular species consumed in reaction with the zeolite. As stated hereinabove, the amount of dissolved fluorosilicates employed with respect to the particular Y zeolite being treated will depend to some extent upon the physical and chemical properties of the individual zeolite as well as other specifications herein contained in this application. However, the minimum value for the amount of fluorosilicate to be added should be at least equivalent to the minimum mole fraction of aluminum to be removed from the Y zeolite.

In this disclosure, including the appended claims, in specifying proportions of Y zeolite starting material or adsorption properties of the zeolite product, and the like, the anhydrous state of the zeolite will be intended unless otherwise stated. The anhydrous state is considered to be that state wherein the zeolite is essentially devoid of physically adsorbed water.

It is apparent from the foregoing that, with respect to reaction conditions, it is desirable that the integrity of the zeolite crystal structure is substantially maintained throughout the process, and that in addition to having extraneous (non-zeolitic) silicon atoms inserted into the lattice, the zeolite retains at least 80 and preferably at least 90 percent of its original crystallinity. A convenient technique for assessing the crystallinity of the products relative to the crystallinity of the starting material is the comparison of the relative intensities of the x-ray diffraction peaks of the respective X-ray powder diffraction patterns. The sum of the peak heights, in terms of arbitrary units above background, of the starting material is used as the standard and is compared with the corresponding peak heights of the products. When, for example, the numerical sum of the peak heights of the product is 85 percent of the value of the sum of the peak heights of the starting zeolite, then 85 percent of the crystallinity has been retained. In practice it is common to utilize only a portion of the x-ray diffraction peaks for this purpose, as for example, five of the six strongest peaks. In zeolite Y these d-spacings correspond to the Miller Indices 331, 440, 533, 642 and 555. Other indicia of the crystallinity retained by the zeolite product are the degree of retention of surface area and the degree of retention of the adsorption capacity. Surface areas can be determined by the well-known Brunauer-Emmett-Teller method (B-E-T) as described in J. Am. Chem. Soc. 60 309 (1938) using nitrogen as the adsorbate. In determining the adsorption capacity the capacity for oxygen at −183° C. at 100 Torr is preferred.

All available evidence, to date, indicates that the above described process is unique in being able to produce zeolites essentially free of defect structure yet having molar $SiO_2/Al_2O_3$ ratios higher than those heretofore obtained by direct hydrothermal synthesis, i.e., no other process is known to date for preparing LZ-210. The products resulting from the operation of the process share the common characteristic of having a higher molar $SiO_2/Al_2O_3$ ratio than previously obtained by direct hydrothermal synthesis by virtue of containing silicon from an extraneous, i.e., non-zeolitic, source, preferably in conjunction with a crystal framework structure which is characterized as containing a low level of tetrahedral defect sites. This defect structure, if present, is revealed by the infrared spectrum of zeolites in the hydroxyl-stretching region.

In untreated, i.e., naturally occurring or as-synthesized zeolites the original tetrahedral structure is conventionally represented as

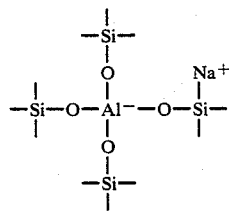

After treatment with a complexing agent such as ethylenediaminetetraacetic acid ($H_4EDTA$) in which a stoichiometric reaction occurs whereby framework aluminum atoms along with an associated cation such as sodium is removed as NaAlEDTA, it is postulated that the tetrahedral aluminum is replaced by four protons which form a hydroxyl "nest", as follows:

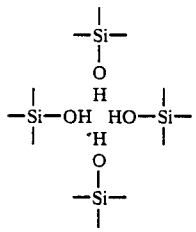

The infrared spectrum of the aluminum-depleted zeolite will show a broad nondescript absorption band beginning at about 3750 cm$^{-1}$ and extending to about 3000 cm$^{-1}$. The size of this absorption band or envelope increases with increasing aluminum depletion of the zeolite. The reason that the absorption band is so broad and without any specific absorption frequency is that the hydroxyl groups in the vacant sites in the framework are coordinated in such a way that they interact with each other (hydrogen bonding). The hydroxyl groups of adsorbed water molecules are also hydrogen-bonded and produce a similar broad absorption band as do the "nest" hydroxyls. Also, certain other zeolitic hydroxyl groups, exhibiting specific characteristic absorption frequencies within the range of interest, will if present, cause infrared absorption bands in these regions which are superimposed on the band attributable to the "nest" hydroxyl groups. These specific hydroxyls are created by the decomposition of ammonium cations or organic cations present in the zeolite.

It is, however, possible to treat zeolites, prior to subjecting them to infrared analysis, to avoid the presence of the interfering hydroxyl groups and thus be able to observe the absorption attributable to the "next" hydroxyls only. The hydroxyls belonging to adsorbed water are avoided by subjecting the hydrated zeolite sample to vacuum activation at a moderate temperature of about 200° C. for about 1 hour. This treatment permits desorption and removal of the adsorbed water. Complete removal of adsorbed water can be ascertained by noting when the infrared absorption band at about 1640 cm$^{-1}$, the bending frequency of water molecules, has been removed from the spectrum.

The decomposable ammonium cations can be removed, at least in large part, by ion-exchange and replaced with metal cations, preferably by subjecting the ammonium form of the zeolite to a mild ion exchange treatment with an aqueous NaCl solution. The OH absorption bands produced by the thermal decomposition of ammonium cations are thereby avoided. Accordingly the absorption band over the range of 3745 cm$^{-1}$ to about 3000 cm$^{-1}$ for a zeolite so treated is almost entirely attributable to hydroxyl groups associated with defect structure and the absolute absorbance of this band can be a measure of the degree of aluminum depletion.

It has been found, however, that the ion-exchange treatment, which must necessarily be exhaustive even though mild, required considerable time. Also the combination of the ion-exchange and the vacuum calcination to remove adsorbed water does not remove every possible hydroxyl other than defect hydroxyls which can exhibit absorption in the 3745 cm$^{-1}$ to 3000 cm$^{-1}$ range. For instance, a rather sharp band at 3745 cm$^{-1}$ has been attributed to the Si—OH groups situated in the terminal lattice positions of the zeolite crystals and to amorphous (non-zeolitic) silica from which physically adsorbed water has been removed. For these reasons we prefer to use a somewhat different criterion to measure the degree of defect structure in the zeolite products of this invention.

In the absence of hydrogen-bonded hydroxyl groups contributed by physically adsorbed water, the absorption frequency least affected by absorption due to hydroxyl groups other than those associated with framework vacancies or defect sites is at 3710±5 cm$^{-1}$. Thus the relative number of defect sites remaining in a zeolite product of this invention can be gauged by first removing any adsorbed water from the zeolite, determining the value of the absolute absorbance in its infrared spectrum at a frequency of 3710 cm$^{-1}$, and comparing that value with the corresponding value obtained from the spectrum of a zeolite having a known quantity of defect structure. The following specific procedure has been arbitrarily selected and used to measure the amount of defect structure in the products prepared in the examples appearing hereinafter. Using the data obtained from this procedure it is possible, using simple mathematical calculation, to obtain a single and reproducible value hereinafter referred to as the "Defect Structure Factor", denoted hereinafter by the symbol "z", which can be used in comparing and distinguishing the present novel zeolite compositions from their less-siliceous prior known counterparts and also with equally siliceous prior known counterparts prepared by other techniques.

DEFECT STRUCTURE FACTOR

(A) Defect Structure Zeolite Standard

Standards with known amounts of defect structure can be prepared by treating a crystalline zeolite of the same species as the product sample with ethylenediaminetetraacetic acid by the standard procedure of Kerr as described in U.S. Pat. No. 3,442,795. In order to prepare the standard it is important that the starting zeolite be well crystallized, substantially pure and free from defect structure. The first two of these properties are readily determined by conventional X-ray analysis and the third by infrared analysis using the procedure set forth in part (B) hereof. The product of the aluminum extraction should also be well crystallized and substantially free from impurities. The amount of aluminum depletion, i.e., the mole fraction of tetrahedral defect structure of the standard samples, can be ascertained by conventional chemical analytical procedure. The molar $SiO_2/Al_2O_3$ ratio of the starting zeolite used to prepare the standard sample in any given case is not narrowly critical, but is preferably within about 10% of the molar $SiO_2/Al_2O_3$ ratio of the same zeolite species used as the starting material in the practice of the process of the present invention.

(B) Infrared Spectrum of Product Samples and Defect Structure Zeolite Standard Fifteen milligrams of the hydrated zeolite to be analyzed are pressed into a 13 mm. diameter self-supporting wafer in a KBr die under 5000 pounds per square inch (psi) pressure. The wafer is then heated at 200° C. for 1 hour at a pressure of not greater than $1 \times 10^{-4}$ mm. Hg to remove all observable traces of physically adsorbed water from the zeolite. This condition of the zeolite is evidenced by the total absence of an infrared absorption band at 1640 cm$^{-1}$. Thereafter, and without contact with absorbable substances, particularly water vapor, the infrared spectrum of the wafer is obtained on an interferometer system at 4 cm$^{-1}$ resolution over the frequency range of 3745 to 3000 cm$^{-1}$. Both the product sample and the standard sample are analyzed using the same interferometer system to avoid discrpancies in the analysis due to different apparatus. The spectrum, normally obtained in the transmission mode of operation, is mathematically converted to and plotted as wave number vs. absorbance.

(C) Determination of the Defect Structure Factor

The defect structure factor (z) is calculated by substituting the appropriate data into the following formula:

$$z = \frac{AA_{(ps)} \times \text{(Mole fraction of defects in the standard)}}{AA_{(std)}}$$

wherein $AA_{(ps)}$ is the infrared absolute absorbance measured above the estimated background of the product sample at 3710 cm$^{-1}$; $AA_{(std)}$ is the absolute absorbance measured above the background of the standard at 3710 cm$^{-1}$ and the mole fraction of defects in the standard are determined in accordance with part (A) above.

Once the defect structure factor, z, is known, it is possible to determine from wet chemical analysis of the product sample for SiO$_2$, Al$_2$O$_3$ and the cation content as M$_{2/n}$O whether silicon has been substituted for aluminum in the zeolite as a result of the treatment and also the efficiency of any such silicon substitution.

The fact that the present process results in zeolite products having silicon substituted for aluminum in the framework is substantiated by the framework infrared spectrum in addition to the hydroxyl region infrared spectrum. In the former, there is a shift to higher wave numbers of the indicative peaks and some sharpening thereof in the case of the present products, as compared to the starting zeolite, which is due to an increased SiO$_2$/Al$_2$O$_3$ molar ratio.

The essential X-ray powder diffraction patterns appearing in this specification and referred to in the appended claims are obtained using standard X-ray powder diffraction techniques. The radiation source is a high-intensity, copper target, x-ray tube operated at 50 Kv and 40 ma. The diffraction pattern from the copper K alpha radiation and graphite monochromator is suitably recorded by an X-ray spectrometer scintillation counter, pulse-height analyzer and strip-chart recorder. Flat compressed powder samples are scanned at 2° (2 theta) per minute, using a 2 second time constant. Interplanar spacings (d) are obtained from the position of the diffraction peaks expressed as 2 theta, where 2 theta is the Bragg angle as observed on the strip chart. Intensities are determined from the heights of diffraction peaks after subtracting background.

The unit cell parameter ($a_o$ in Angstroms) of the starting zeolites and products are determined herein on fully hydrated samples, e.g., samples which have been hydrated and equalibrated in at least 50% relative humidity for at least 72 hours. The importance of measuring the $a_o$ of fully hydrated samples will be further discussed hereinafter in the examples.

In determining the cation equivalency, i.e., the molar ratio M$_{2/n}$O/Al$_2$O$_3$ in each zeolite product, it is advantageous to perform the routine chemical analysis on a form of the zeolite in which "M" is a monovalent cation other than hydrogen. This avoids the uncertainty which can arise in the case of divalent or polyvalent metal zeolite cations as to whether the full valence of the cation is employed in balancing the net negative charge associated with each AlO$_4^-$ tetrahedron or whether some of the positive valence of the cation is used in bonding with OH$^-$ or H$_3$O$^+$ ions.

In one embodiment the novel crystalline aluminosilicate compositions of the present invention will contain a chemical or molar framework composition which can be determined from the expression of mole fractions of framework tetrahedra previously described:

$$[Al_{(a-N)}Si_{b+(N-\Delta z)}\square_z]O_2$$

wherein: the framework Si/Al ratio is determined by $$\frac{b + (N - \Delta z)}{a - N}$$

and is numerically greater than 3, and in a further embodiment greater than 4, the mole fraction of silicon tetrahedra substituted into the framework of the product zeolite (N$-\Delta$z) is increased by at least a value for $$\frac{(N - \Delta z)}{N}$$

which is numerically equal to or greater than 0.5, the change in Defect Structure Factor $\Delta$z is increased by less than 0.08 and preferably less than 0.05.

Moreover, regardless of the Defect Structure Factor of any zeolite material which has been treated according to the present process, it is novel by virtue of having had extraneous silicon inserted into its crystal lattice and having a molar SiO$_2$/Al$_2$O$_3$ ratio greater than heretofore obtained by direct hydrothermal synthesis. This is necessarily the case since all other methods for increasing the SiO$_2$/Al$_2$O$_3$ ratio of a zeolite crystal must remove framework aluminum atoms, and unless at least one of those removed aluminum atoms is replaced by a silicon atom from a source other than the crystal itself, the absolute defect structure content of the crystal must be greater than that of LZ-210.

The following examples are provided to illustrate the instant invention and are not intended to be limiting thereof:

EXAMPLE 1

To a reaction vessel provided with heating and stirring means and containing 4000 lbs of H$_2$O was added 1000 lbs of a NH$_4$Y, which was an 87% ammonium exchanged NaY zeolite. The slurry was heated to 75° C. In a separate vessel an ammonium fluorosilicate [(NH$_4$)$_2$SiF$_6$] solution was prepared by dissolving 155.5 lbs of the fluorosilicate salt in 1375 lbs. of water heated to 52°-57° C. The fluorosilicate solution was added to the zeolite slurry at a constant rate by means of a metering pump over a period of 1.5 hours. The reaction slurry was maintained at 75° C. throughout the fluorosilicate addition. Following the fluorosilicate addition, a sample of the reaction slurry was taken, heated at 95° C. for an additional hour, filtered and washed with hot distilled water until tests of the filtrate were negative for aluminum and fluoride ion. The dried product (LZ-210) had the following chemical analysis compared to the untreated $NH_4Y$.

|  | $NH_4Y$ | LZ-210 Product |
|---|---|---|
| $Na_2O$ (wt. %) | 2.3 | 1.5 |
| $(NH_4)_2O$ (wt. %) | 9.8 | 7.7 |
| $Al_2O_3$ (wt. %) | 21.9 | 18.3 |
| $SiO_2$ (wt. %) | 65.1 | 72.1 |
| $F_2$ (wt. %) | — | 0.1 |
| $SiO_2/Al_2O_3$ (mole) | 5.04 | 6.69 |
| $Na^+/Al$ | 0.17 | 0.14 |
| $NH_4^+/Al$ | 0.87 | 0.82 |
| Cation Equivalent, $M^+/Al$ | 1.04 | 0.96 |

A comparison of properties of the LZ-210 product with the untreated $NH_4Y$ is shown below:

|  | $NH_4Y$ | LZ-210 Product |
|---|---|---|
| X-Ray Crystallinity: |  |  |
| By Peak Area, % | 100 | 104 |
| Unit Cell Size, $a_o$ in Å: | 24.691 | 24.590 |
| Crystal Collapse Temp., °C. (DTA): | 887 | 974 |
| Framework Infrared: |  |  |
| Asymmetric Stretch, $cm^{-1}$ | 1015 | 1034 |
| Symmetric Stretch, $cm^{-1}$ | 787 | 798 |
| Hydroxyl Infrared: |  |  |
| Absolute Absorbance at 3710 $cm^{-1}$ | 0.040 | 0.058 |
| Defect Structure Factor, z: | 0.017 | 0.025 |

The framework mole fractions of oxides are set forth below for the untreated $NH_4Y$ and the product LZ-210:

(a) Mole fraction of oxides ($TO_2$): $NH_4Y = (Al_{0.280}Si_{0.707}\square_{0.017})O_2$; $LZ-210 = (Al_{0.224}Si_{0.751}\square_{0.025})O_2$ (b) Mole fraction of aluminum removed, N; 0.056

(c) Percent of framework aluminum removed, $N/a \times 100$; 20

(d) Change in defect structure factor, $\Delta z$; 0.008

(e) Moles of silicon substituted per mole of aluminum removed, $(N - \Delta z)/N$; 0.79

EXAMPLE 2

To a solution of 200 ml. of 3.5 molar $NH_4F$ solution containing 3.14 gm of ammonium fluorosilicate was added 4.79 gm of a $NH_4Y$, which was an 86% ammonium exchanged NaY zeolite. The slurry was stirred at room temperature (~22° C.) for two hours, filtered, and washed with two liters of distilled water and dried. Chemical analyses of the LZ-210 product compared to the starting $NH_4Y$ zeolite are shown below.

|  | $NH_4Y$ | LZ-210 Product |
|---|---|---|
| $Na_2O$ (wt. %) | 1.69 | 1.30 |
| $(NH_4)_2O$ (wt. %) | 9.94 | 5.92 |
| $Al_2O_3$ (wt. %) | 22.68 | 16.68 |
| $SiO_2$ (wt. %) | 65.35 | 75.73 |
| $F_2$ (wt. %) | — | 0.37 |
| $SiO_2/Al_2O_3$ | 4.89 | 7.70 |
| $Na^+/Al$ | 0.12 | 0.13 |
| $NH_4^+/Al$ | 0.86 | 0.69 |
| Cation Equivalent, $M^+/Al$ | 0.98 | 0.82 |

A comparison of the properties of the LZ-210 product with untreated $NH_4Y$ is shown below:

|  | $NH_4Y$ | LZ-210 Product |
|---|---|---|
| X-Ray Crystallinity: |  |  |
| By Peak Intensity (%) | 100 | 62 |
| Unit Cell Size, $a_o$ in Å: | 24.663 | 24.510 |
| Crystal Collapse Temp., °C. (DTA): | 870 | 940 |
| Framework Infrared: |  |  |
| Asymmetric Stretch, $cm^{-1}$ | 1010 | 1025 |
| Symmetric Stretch, $cm^{-1}$ | 775 | 795 |
| Hydroxyl Infrared: |  |  |
| Absolute Absorbance at 3710 $cm^{-1}$ | 0.040 | very large |
| Defect Structure Factor, z: | 0.017 | >0.050 |

EXAMPLE 3

To a solution of 100 ml. of 3.5 molar $NH_4OAc$ (ammonium acetate) solution was added 2.37 gm. of an 85% ammonium exchanged NaY zeolite. A second solution containing 3.95 gm. of ammonium fluorosilicate in 250 ml. of distilled water was prepared. Forty (40) ml. of the $(NH_4)_2SiF_6$ solution were added to the zeolite slurry with stirring at about 22° C. in 1 ml. increments with 2 minutes allowed for equilibrium between each incremental addition. Sufficient Si was added to the zeolite as $(NH_4)_2SiF_6$ to remove and replace ⅓ of the framework aluminum in the zeolite. The LZ-210 product retained 95% of its x-ray crystallinity, had a unit cell value of 24.60 Å and a crystal collapse temperature of 920° C. The LZ-210 product had a $SiO_2/Al_2O_3$ ratio of 6.25 and a Cation Equivalent $(M^+/Al)$ of 0.98. Hydroxyl region infrared spectra showed only slight adsorbance over background at 3710 $cm^{-1}$ indicating that very few defects were created in the zeolite framework as a result of this treatment.

EXAMPLE 4

To a reaction vessel provided with heating and stirring means and containing 58 gallons of $H_2O$ was added 180 lbs of an 87% ammonium exchanged NaY zeolite. The slurry was heated to 75° C. In a separate vessel 20.6 pounds of ammonium fluorosilicate $[(NH_4)_2SiF_6]$ was dissolved in 10 gallons of water heated to 50° C. The solution was added to the zeolite slurry at a constant rate by means of a metering pump over a 70 minute interval. Following addition of the fluorosilicate solution the slurry was filtered, washed with 1800 gallons of hot water and dried. The dried product had the following chemical analysis compared to the untreated $NH_4Y$.

|  | $NH_4Y$ | LZ-210 Product |
|---|---|---|
| $Na_2O$ (wt. %) | 2.3 | 2.3 |
| $(NH_4)_2O$ (wt. %) | 9.8 | 7.3 |
| $Al_2O_3$ (wt. %) | 21.9 | 19.1 |
| $SiO_2$ (wt. %) | 65.1 | 70.0 |
| $F_2$ (wt. %) | — | 0.07 |
| $SiO_2/Al_2O_3$ | 5.04 | 6.22 |
| $Na^+/Al$ | 0.17 | 0.20 |
| $NH_4^+/Al$ | 0.87 | 0.75 |
| Cation Equivalent, $M^+/Al$ | 1.04 | 0.95 |

A comparison of the properties of the LZ-210 product with untreated $NH_4Y$ is shown below:

|  | NH4Y | LZ-210 Product |
|---|---|---|
| X-Ray Crystallinity: | | |
| By Peak Area | 100 | 94 |
| Unit Cell Size, $a_o$ in Å: | 24.691 | 24.618 |
| Crystal Collapse Temp., °C. (DTA): | 887 | 959 |
| Framework Infrared: | | |
| Symmetric Stretch, $cm^{-1}$ | 787 | 795 |
| Hydroxyl Infrared: | | |
| Absolute Absorbance at 3710 $cm^{-1}$ | 0.040 | 0.100 |
| Defect Structure Factor, z: | 0.017 | 0.042 |

The framework mole fractions of oxides are set forth below for the untreated NH4Y and the product LZ-210.

(a) Mole Fraction of oxides (TO2): NH4Y=(Al$_{0.280}$Si$_{0.707}$☐$_{0.017}$)O2; LZ-210=(Al$_{0.233}$Si$_{0.725}$☐$_{0.042}$)O2

(b) Mole fraction of aluminum removed, N; 0.047

(c) Percent of framework aluminum removed, N/a×100; 17

(d) Change in defect structure fractor, Δz; 0.025

(e) Moles of silicon substituted per mole of aluminum removed, (N−Δz)/N; 0.38

EXAMPLE 5

(a) 396 grams of (NH4)2SiF6 were dissolved with stirring in 3 liters of distilled water at 50° C. This solution was put into a dropping funnel fitted on a three-necked round-bottom flask. A solution of 6400 grams of ammonium acetate in 8 liters of water was then added to the flask. An 85% ammonium exchanged zeolite NaY in the amount of 1420 grams (hydrated weight, molar SiO2/Al2O3=4.85) was slurried in the ammonium acetate solution at 75° C. A mechanical stirrer was fitted to the center hole of the flask, which was also fitted with the necessary thermocouples and temperature controllers. Dropwise titration of the 3 liters of (NH4)2SiF6 solution was begun at 75° C. After completion of titration, which required a period of 2.5 hours, the pH of the slurry was measured as 6.0. Overnight heating of the mixture was conducted at 95° C., the dropping funnel having been replaced with a condenser. The stoichiometry of the reaction was of the order of one Si added as (NH4)2SiF6 for every two Al atoms present in the zeolite. At the conclusion of the reaction, the pH of the slurry was 6.75.

The reaction mixture was then filtered as two separate batches and the solids washed with 18 liters of hot distilled water. There was a residue of (NH4)3AlF6 present in the washed materials. An additional wash of the products in ammonium acetate was performed, followed by a thorough wash with boiling distilled H2O until qualitative tests could not detect either aluminum or fluoride ions in the effluent wash water.

The properties of this material were as follows:

Chemical Analysis

| Composition By Weight %: | | Molar Composition: | |
|---|---|---|---|
| Na2O | 0.66 | Na2O/Al2O3: | 0.08 |
| (NH4)2O: | 6.50 | (NH4)2O/Al2O3: | 0.91 |
| Al2O3: | 13.97 | Cation Equivalent: | 0.99 |
| SiO2: | 78.55 | Cation Deficiency: | 1% |
| F−: | 0.22 | F2/Al: | 0.005 |
| | | SiO2/Al2O3: | 9.54 |

The product had the characteristic X-ray powder diffraction pattern of zeolite LZ-210 and had a unit cell dimension ($a_o$) of 24.51 Å. From peak intensity measurements, the crystallinity of the product was 94 percent. The water adsorption capacity at 25° C. and 4.6 torr was 28.7 weight %. The oxygen adsorption capacity at −183° C. and 100 torr oxygen pressure was 29.3 weight % (wt.%). The crystal collapse temperature of the product as measured by a standard DTA procedure was at 1061° C. Untreated NH4Y using the same DTA technique collapses at 861° C. The framework infrared spectra of the starting zeolite and the product zeolite are shown in FIGS. 1a and 1b of the drawings, respectively.

Figure 2:
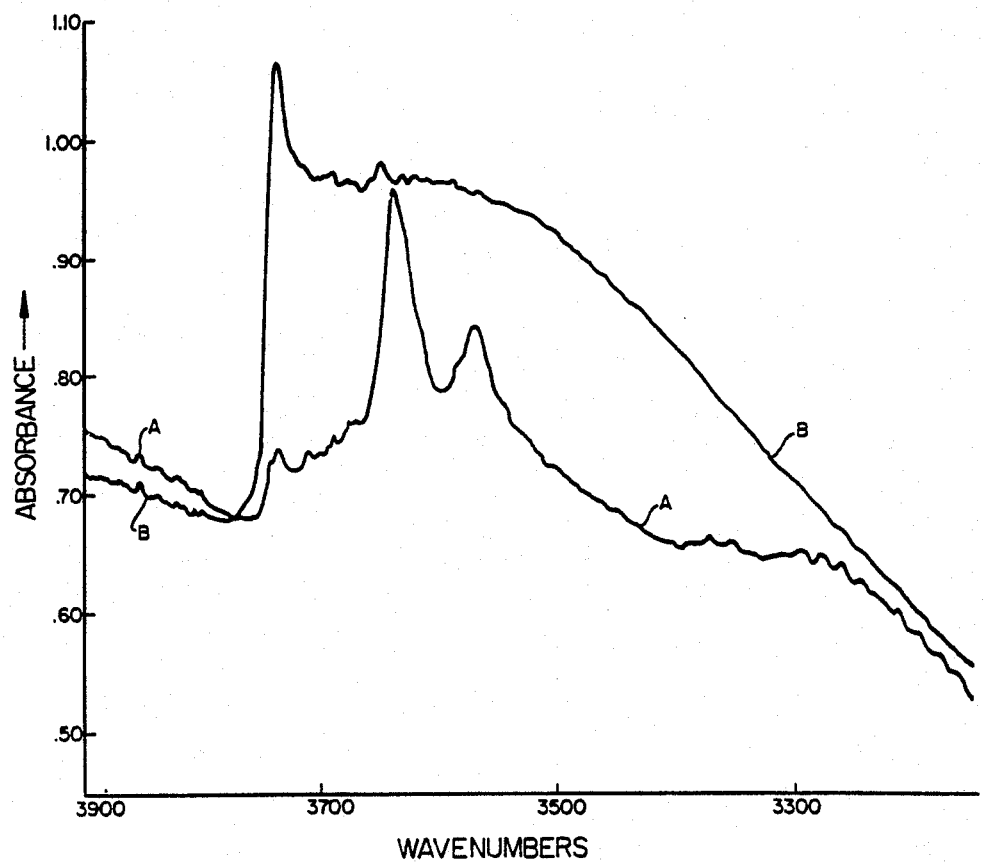
FIG. 2 depicts the infrared spectra of a sodium exchanged LZ-210 and an ammonium exchanged LZ-210.

(b) The product of part (a) above was subjected to a mild ion exchange treatment with NaCl solution to replace most of the ammonium cations and then heated under vacuum at 200° C. for 1 hour to remove adsorbed (molecular) water, and its hydroxyl region infrared spectrum obtained. The spectrum, denoted as "A" in FIG. 2, shows a small broad absorption band with maximum absorbance at about 3300 $cm^{-1}$ which is attributable to the residual undecomposed ammonium cations, two absorption bands at 3640 $cm^{-1}$ and 3550 $cm^{-1}$ attributed to OH groups produced by the decomposition of some of the residual ammonium cations, and a very small broad absorption band due to the hydroxyl "nests" in vacant framework sites in the zeolite. This absorption band is best observed in the region of about 3710–3715 $cm^{-1}$ when compared to the background absorption due to the zeolite.

Four hundred fifty grams (gm) of NaY containing 1.97 moles of aluminum as Al2O3 were slurried in 8 liters of distilled water with 287.7 gm of H4EDTA (0.98 moles). This stirring slurry was refluxed for 18 hours, filtered washed and dried in air 2 hours at 110° C. From the chemical analyses the product, Labeled Defect Structure Standard, Sample A, was 48% depleted in aluminum. The calculated mole fractions of defects in the structure of the Defect Structure Standard, Sample A, was 0.140. The framework composition expressed in terms of tetrahedral mole fractions (TO2) was:

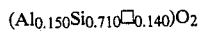

(Al$_{0.150}$Si$_{0.710}$☐$_{0.140}$)O2

Spectrum B of FIG. 2 is the spectrum of Defect Structure Standard, Sample A, from which 48% of the zeolite framework aluminum has been removed by extraction with H4EDTA. The infrared sample was heated under vacuum at 200° C. for 1 hour to remove water. The spectrum shows the expected broad absorption band due to hydroxyl nests in vacant framework sites. In addition, there is a sharp absorption band at 3745 $cm^{-1}$ attributed to terminal ≡SiOH groups in the zeolite structure as previously discussed. Similar bands are also observed with amorphous silica. The spectra have been recorded in FIG. 2 such that a nearly quantitative comparison can be made between the two samples. It becomes obvious then that the product of the (NH4)2SiF6 treatment of NH4Y, from which 50% of the framework aluminum atoms have been removed, contains very few residual vacancies or hydroxyl nests in the framework. It is even further obvious that the silicon taken up by the zeolite during the (NH4)2SiF6 treatment must be substituted into the previously vacant framework sites. No new absorption band at 3745 $cm^{-1}$ due to amorphous ≡SiOH is observed in this spectrum.

(c) The absolute absorbance of the Defect Structure Standard, Sample A, measured at 3710 $cm^{-1}$ as in FIG. 2 was 0.330. The absolute absorbance of the LZ-210 product of part (b) measured at 3710 cm$^{-1}$ as in FIG. 2 was 0.088. The Defect Structure Factor, z, for the LZ-210 product was calculated:

$$(\text{unkown } z) = \frac{\left[\begin{array}{c}\text{Absolute Absorbance}\\\text{of the Unkown}\\\text{Measured at}\\3710\ cm^{-1}\end{array}\right] \times \left[\begin{array}{c}\text{mole fraction}\\\text{of defects in}\\\text{the standard}\end{array}\right]}{\left[\begin{array}{c}\text{Absolute Absorbance of Standard}\\\text{measured at 3710 }cm^{-1}\end{array}\right]}$$

Substituting the above values into the equation, the defect structure factor, z, for the LZ-210 product is $$\frac{0.088 \times 0.140}{0.330};$$

and z=0.037.

The framework composition of the LZ-210 product of part (b) of this example can be expressed:

$$(Al_{0.167}Si_{0.796}\square_{0.037})O_2$$

The framework composition of the NH$_4$Y used to prepare the LZ-Z10 can be expressed: $(Al_{0.292}Si_{0.708}\square_{0.0})O_2$. Comparing the LZ-210 product with the NH$_4$Y starting material, the change in Defect Structure Factor, $\Delta z$, is 0.037, well below the preferred maximum specification for LZ-210 of 0.05. The mole fraction of aluminum removed from the framework, N, is 0.125. The increased silicon content of the framework of the LZ-210 product, expressed as a function of the removed aluminum actually replaced by silicon is:

$$\frac{N - \Delta z}{N} = \frac{0.125 - 0.037}{0.125} = 0.70$$

EXAMPLE 6

This example provides further proof that in the present process aluminum is removed from the zeolite framework and replaced in the framework by silicon from an extraneous source. Two grams (anhydrous weight) of ammonium zeolite Y (SiO$_2$/Al$_2$O$_3$ molar ratio=4.8) were slurried in 100 ml of 3.4 molar ammonium acetate solution at 75° C. The total aluminum content of the zeolite sample was 8.90 millimoles. A 50 ml solution containing 0.793 gm. (NH$_4$)$_2$SiF$_6$ was added to the stirring slurry of the zeolite in 2 ml increments with 5 minutes between each addition. A total of 4.45 millimoles of Si was added to the zeolite. The mixture was kept at 75° C. for 18 hours, filtered and washed. Analysis of the filtrate and washings showed that of the 4.45 millimoles of silicon added, 3.48 millimoles were consumed by the zeolite during the reaction. At the same time, the zeolite released 3.52 millimoles of aluminum to solution. The molar SiO$_2$/Al$_2$O$_3$ of the zeolite, based on the filtrate analysis was calculated to be 9.30. Chemical analysis of the solid product gave a SiO$_2$/Al$_2$O$_3$ ratio of 9.31. These data prove conclusively that as a result of our treatment using buffered (NH$_4$)$_2$SiF$_6$, silicon insertion had occurred.

From the peak intensity measurements, the product was 106 percent crystalline. The unit cell (a$_o$) was 24.49 Å. The DTA exotherm denoting crystal collapse was found at 1037° C. The intensity of the infrared OH absorption band measured at 3710 cm$^{-1}$ following activation of the zeolite wafer at 200° C. attributable to (OH)$_4$ groups in aluminum depleted sites was very small, indicating that very few defect sites were present in the product. The oxygen adsorption capacity of the product measured at −183° C. and 100 Torr was 25.8 weight percent.

EXAMPLE 7

To a reaction vessel provided with heating and stirring means and containing 121.8 pounds (14.61 gal.) of water and 18.5 pounds of ammonium acetate was added 30 pounds (anhydrous basis) of 80% ammonium exchanged zeolite NaY having a SiO$_2$/Al$_2$O$_3$ molar ratio of 4.97. The resulting slurry was heated to 75° C. In a separate vessel an ammonium fluorosilicate [(NH$_4$)$_2$SiF$_6$] solution was prepared by dissolving 12.25 pounds of the silicate in 46.8 pounds of water at a temperature of 50° C. By means of a metering pump, the fluorosilicate solution was added to the buffered zeolite slurry at the rate of 0.031 gallons per minute. About 3 hours was required to complete the addition. At the end of the addition period, the resultant mixture was heated to 95° C. with continuous agitation for a period of 16 hours, filtered, and washed with about 250 gallons of water at a temperature of 50° C. and dried. The product had the following properties:

(a) X-ray crystallinity (relative)=90%.
(b) Temperature of crystal collapse (by DTA exotherm)=1110° C.
(c) Oxygen adsorption capacity (−183° C., 100 torr)=26.1 wt. %.
(d) Water adsorption capacity (25° C., 4.6 torr)=24.5 wt. %.
(e) SiO$_2$/Al$_2$O$_3$ molar ratio=11.98.
(f) Zeolitic cation equivalence (M$_2$O/Al$_2$O$_3$)=1.0.
(g) Unit cell dimensions, a$_o$, =24.44 Angstroms.

The framework composition of the starting NH$_4$Y expressed in terms of its molar fractions of tetrahedra can be stated thusly:

$$(Al_{0.286}Si_{0.714})O_2$$

The Defect Structure Factor, z, for the LZ-210 product is 0.055; the infrared absolute absorbance measured at 3710 cm$^{-1}$ was 0.130. The framework composition of the LZ-210 product can be expressed as:

$$(Al_{0.135}Si_{0.810}\square_{0.055})O_2$$

The change in the Defect Structure Factor, $\Delta z$, for the LZ-210 is 0.055. The mole fraction of aluminum removed, N, is 0.151 and the amount of removed aluminum replaced by silicon is $$\frac{N - \Delta z}{N} = 0.64.$$

All other characteristic properties of the LZ-210 zeolite compositions of this invention, i.e. X-ray powder diffraction pattern and infrared spectra were exhibited by the product of this example.

EXAMPLE 8

(a) Forty-seven grams of a NH$_4$Y containing 0.2065 moles of aluminum as Al$_2$O$_3$, were treated with (NH$_4$)$_2$H$_2$ EDTA and dilute HCl, sufficient to extract 43% of the framework aluminum in the NH$_4$Y, over a period of 4 days in accordance with the teachings and examples of Kerr in U.S. Pat. No. 4,093,560. This was labeled Sample B.

(b) Two thousand five hundred grams of NH$_4$Y were stirred into 10 liters of 3.5M ammonium acetate solution at 75° C. A 3.5 liter solution of water containing 990 gm. (NH$_4$)$_2$SiF$_6$ was heated to 75° C. and added in 100 ml. increments to the NH$_4$Y slurry at the rate of 100 ml every 5 minutes. Following the addition of the fluorosilicate solution, the temperature of the slurry was raised to 95° C. and the slurry was digested at 95° C. for 17 hours. The digested slurry was filtered and the filter cake washed until tests of the wash water were negative for aluminum and fluoride ion. This was labeled Sample C.

(c) The chemical and other analyses for the two samples are set forth below together with similar data obtained on Defect Structure Standard, Sample A, prepared in (b) of Example 1.

ml. of water was added to the slurry (pH$\geq$6) in 1 ml. increments at the rate of 1 ml. per minute. The stoichiometric ratio of moles of Si, added as ammonium fluorosilicate, to the moles of Al present in the zeolite was 0.21. Following the addition of the fluorosilicate solution, the slurry was digested for 3 hours at 95° C., filtered, and the filter cake thoroughly washed until tests of the wash water were negative for aluminum and the fluoride ion. The chemical and other analyses for the starting NH$_4$Y zeolite and the product zeolite are set forth below:

|  | NH$_4$Y | Product |
|---|---|---|
| Na$_2$O (wt. %) | 3.1 | 2.8 |
| (NH$_4$)$_2$O (wt. %) | 9.8 | 8.3 |
| Al$_2$O$_3$ (wt. %) | 28.3 | 22.9 |
| SiO$_2$ (wt. %) | 58.2 | 65.2 |
| SiO$_2$/Al$_2$O$_3$ (molar) | 3.50 | 4.84 |

|  | Specifications | Sample A* | Sample B** | Sample C*** |
|---|---|---|---|---|
| SiO$_2$/Al$_2$O$_3$ (molar) Product | $\geq$8 | 9.49 | 9.14 | 10.49 |
| Cation Equivalent (M$^+$/Al) | $\geq$0.9 | 0.95 | 0.92 | 0.97 |
| Absolute Absorbance at 3710 cm$^{-1}$ | — | 0.330 | 0.275 | 0.079 |
| Framework Composition: |  |  |  |  |
| Mole Fraction of oxides (TO$_2$): |  |  |  |  |
| Starting zeolite | — | (Al$_{0.290}$Si$_{0.710}$)O$_2$ | (Al$_{0.286}$Si$_{0.714}$)O$_2$ | (Al$_{0.289}$Si$_{0.711}$)O$_2$ |
| Product zeolite | — | (Al$_{0.150}$Si$_{0.710}$□$_{0.140}$)O$_2$ | (Al$_{0.159}$Si$_{0.724}$□$_{0.117}$)O$_2$ | (Al$_{0.155}$Si$_{0.811}$□$_{0.034}$)O$_2$ |
| Mole Fraction of Aluminum Removed, N |  | 0.140 | 0.127 | 0.134 |
|  |  | (0.3a = .087) | (0.3a = .086) | (0.3a = .087) |
| % Aluminum Depletion $\frac{N}{a} \times 100$ | $\geq$5 | 48 | 44 | 46 |
| Net Change in the Defect Structure Factor, $\Delta z$ | $\leq$0.08 | 0.140 | 0.117 | 0.034 |
| Moles of Silicon substantial per mole of aluminum removed, $\frac{N - \Delta z}{N}$ | $\geq$0.5 | 0 | 0.08 | 0.75 |
| Product X-ray Crystallinity, % 1 | $\geq$80 | 68 | 68 | 90 |
| Unit Cell, (a$_o$) |  | 24.59 | 24.57 | 24.45 |
| DTA Crystal Collapse Temp., °C. | — | 980 | 947 | 1092 |

*Defect Structure Standard
**Prior art (U.S. Pat. No. 4,093,568)
***LZ-210

These data cleary distinguish the LZ-210 product (Sample C) from the prior art product (Sample B). Both Sample B and Sample C are aluminum depleted to the same level as the reference Defect Structure Standard (Sample A). The prior art product shows no evidence that silicon from any source has substituted in the framework in place of the aluminum. In fact, the prior art sample and the reference Defect Structure Standard are nearly identical in all of their properties. The LZ-210 product shows evidence of very little defect structure, indicating that in this case silicon has replaced aluminum in the framework.

EXAMPLE 9

(A) One hundred grams of a well-crystallized zeolite Y having a molar SiO$_2$/Al$_2$O$_3$ ratio of 3.50 was slurried with 500 ml. of a 4 molar aqueous NH$_4$Cl solution at reflux for one hour and then isolated by filtration. This exchange procedure was repeated twice, and the product of the third exchange washed with hot distilled water until tests of the wash water were negative for chloride ions. Sixty grams (anhydrous weight) of the NH$_4$$^+$-exchanged product were slurried in 400 ml. of 3.4 molar ammonium acetate solution of 95° C. A solution of 12.53 grams of ammonium fluorosilicate in 150

| | | |
|---|---|---|
| Na$^+$/Al | 0.18 | 0.20 |
| NH$_4$$^+$/Al | 0.68 | 0.71 |
| Cation Equiv. (M$^+$/Al) | 0.86 | 0.91 |
| X-ray Crystallinity: |  |  |
| (a) By Peak Intensity | 100 | 98 |
| (b) By Peak Area | 100 | 97 |
| Unit cell dimension (a$_o$ in Å) | 24.81 | 24.734 |
| Framework Infrared: |  |  |
| Asymmetric Stretch, cm$^{-1}$ | 891 | 1003 |
| Symmetric Stretch, cm$^{-1}$ | 771 | 782 |
| Hydroxyl Infrared: |  |  |
| Absolute Abs. at 3710 cm$^{-1}$ | 0.039 | 0.058 |
| Defect Structure Factor, z | 0.016 | 0.025 |

The framework mole fractions of tetrahedra are set forth below for the starting NH$_4$Y and the LZ-210 product.

(a) Mole fraction of oxides (TO$_2$): NH$_4$Y=(Al$_{0.358}$Si$_{0.626}$□$_{0.016}$)O$_2$; Product Zeolite=(Al$_{0.285}$Si$_{0.690}$□$_{0.025}$)O$_2$ (b) Mole fraction of aluminum removed, N: 0.073

(c) % aluminum removed, N/a$\times$100: 20

(d) change in defect structure factor, $\Delta z$: 0.009

(e) moles of silicon substituted per mole of aluminum removed, $$\frac{N - \Delta z}{N} : 0.88$$

The analytical data show conclusively that framework aluminum was removed and replaced by silicon as a result of the fluorosilicate treatment. The X-ray crystallinity was fully maintained and the unit cell dimension decreased as would be expected due to the smaller atomic size of silicon with respect to aluminum.

(B) The adverse effects of using a starting zeolite having a molar $SiO_2/Al_2O_3$ ratio of less than 3 is demonstrated by the following procedure:

One hundred grams of an ammonium-exchanged zeolite X having a molar $SiO_2/Al_2O_3$ ratio of 2.52 were slurried in 1000 ml. of an aqueous 2.0 molar solution of ammonium acetate at a temperature of 75° C. Five hundred milliliters of a second aqueous solution containing 59.75 grams of ammonium fluorosilicate was added to the slurry in 10 ml. increments at a rate of 10 ml. every 5 minutes. The stoichiometric ratio of moles of silicon added, to the moles of aluminum present in the zeolite was 0.50. Following the addition of the fluorosilicate solution, the slurry was digested for 16 hours at 95° C., filtered, and washed with distilled water until tests of the wash water were negative for both aluminum and fluoride ions. The chemical and other analyses for the starting $NH_4Y$ zeolite and the product zeolite are set forth below:

|  | $NH_4X$ | Product |
|---|---|---|
| $Na_2O$ (wt. %) | 3.2 | 0.5 |
| $(NH_4)_2O$ (wt. %) | 10.8 | 6.5 |
| $Al_2O_3$ (wt. %) | 34.2 | 19.0 |
| $SiO_2$ (wt. %) | 50.8 | 72.0 |
| $SiO_2/Al_2O_3$ (molar) | 2.52 | 6.43 |
| $Na^+/Al$ | 0.15 | 0.04 |
| $NH_4^+/Al$ | 0.62 | 0.67 |
| Cation Equivalent (M+/Al): | 0.77 | 0.71 |
| X-ray Crystallinity: |  |  |
| (a) By Peak Intensity: | 100 | <10 |
| Unit cell dimension ($a_o$ in Å): | 24.945 | — |
| Framework Infrared: |  |  |
| (a) Asymmetric Stretch, $cm^{-1}$ | 987 | 1049 |
| (b) Symmetric Stretch, $cm^{-1}$ | 749 | 780 |
| Hydroxyl Infrared, |  |  |
| Absolute Abs. at 3710 $cm^{-1}$: | 0.110 | 0.224 |
| Defect Structure Factor, z: | 0.047 | 0.095 |

It is apparent from the foregoing data that although dealumination in conjunction with silicon substitution into the zeolite framework did occur, the procedure was highly destructive of the crystallinity of the product zeolite. Also the remaining crystal structure contained an undue number of defect sites.

(C) In a second attempt to treat the $NH_4X$ of part (B), a 5 gram sample of the zeolite was slurried in 100 ml. of a 3.4 molar ammonium acetate solution at 95° C. Fifty milliliters of a second aqueous solution containing 1.49 grams of ammonium fluorosilicate was added to the slurry in 2 ml. increments at a rate of 2 ml. every five minutes. The stoichiometric ratio of moles of silicon added, to the moles of zeolitic aluminum was 0.25. Following the completion of the addition of the fluorosilicate solution, the slurry was digested for 3 hours, filtered and washed. Although the treatment of this part (C) was much less rigorous than that of part (B) above by virtue of increased buffering, lower fluorosilicate concentration and shorter digestion time, the product of part (C) was found to be nearly amorphous.

EXAMPLE 10

Ten gm. (anhydrous weight) of ammonium zeolite Y ($SiO_2/Al_2O_3$ molar ratio=4.93) were slurried in 100 ml of 3.4 molar ammonium acetate solution at 75° C. A 50 ml. solution of water containing 4.63 gm $Li_2SiF_6 \cdot 2H_2O$ was added to the zeolite slurry in 1 ml. increments at an addition rate of 1 ml. every 5 minutes. Following addition of the $Li_2SiF_6$ solution, the reaction mixture was digested 17 hours at 75° C., with stirring. After the digestion period the reaction mixture was filtered and the filter cake thoroughly washed with distilled $H_2O$ until tests of the wash water proved negative for both fluoride and aluminum ions. The product was dried two hours at 110° C. in air. The chemical and other analyses for the starting $NH_4Y$ zeolite and the LZ-210 product zeolite are set forth below.

|  | $NH_4Y$ | LZ-210 Product |
|---|---|---|
| $Na_2O$ (wt. %) | 2.5 | 0.6 |
| $(NH_4)_2O$ (wt. %) | 9.5 | 3.7 |
| $Li_2O$ (wt. %) | — | 0.4 |
| $Al_2O_3$ (wt. %) | 22.2 | 9.7 |
| $SiO_2$ (wt. %) | 64.4 | 85.0 |
| $SiO_2/Al_2O_3$ (molar) | 4.93 | 14.80 |
| $Na^+/Al$ | 0.19 | 0.10 |
| $NH_4^+/Al$ | 0.84 | 0.74 |
| $Li^+/Al$ | — | 0.13 |
| Cation Equiv. (M+/Al) | 1.03 | 0.98 |
| Xray Crystallinity: |  |  |
| (I) By Peak Intensity | 100 | 83 |
| Unit cell dimension ($a_o$ in Å): | 24.712 | 24.393 |
| Framework Infrared: |  |  |
| Asymmetric Stretch, $cm^{-1}$ | 1015 | 1061 |
| Symmetric Stretch, $cm^{-1}$ | 787 | 818 |
| Hydroxyl Infrared: |  |  |
| Absolute Abs. at 3710 $cm^{-1}$ | — | 0.160 |
| Defect Structure Factor, z: | 0.000 | 0.068 |

The framework mole fractions of tetrahedra are set forth below for the starting $NH_4Y$ and the LZ-210 product.

(a) Mole fraction of framework oxides ($TO_2$):

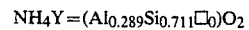

$NH_4Y = (Al_{0.289}Si_{0.711}\square_0)O_2$

$LZ-210 = (Al_{0.111}Si_{0.821}\square_{0.068})O_2$ (b) Mole fraction of aluminum removed; N: 0.178
(c) % framework aluminum removed; N/a×100: 62
(d) Change in defect structure factor; $\Delta z$: 0.068
(e) Moles of silicon substituted per mole of aluminum removed; $(N-\Delta z)/N$: 0.62

In addition to the above described properties, the crystal collapse temperature of the LZ-210 product as measured by the standard DTA procedure was at 1128° C. The untreated $NH_4Y$ crystal collapse temperature measured by the same DTA technique was at 890° C.

EXAMPLE 11

Ten gm. (anhydrous weight) of ammonium zeolite Y ($SiO_2/Al_2O_3$ molar ratio=4.93) were slurried in 100 ml. of 3.4 molar ammonium acetate solution at 75° C. Reagent grade $K_2SiF_6$ (5.32 gm) crystals were added directly to the slurry. The reaction mixture was digested at 75° C. with stirring for two days, after which it was filtered and the filter cake thoroughly washed with hot distilled water until tests of the wash water proved negative for both fluoride and aluminum ions. The X-ray powder pattern obtained on the dried product did not show any extraneous peaks indicative of impurities precipitated in the zeolite matrix. The chemical and other analyses for the starting NH$_4$Y zeolite and the LZ-210 product zeolite are set forth below:

|  | NH$_4$Y | LZ-210 Product |
|---|---|---|
| Na$_2$O (wt. %) | 2.5 | 1.2 |
| (NH$_4$)$_2$O (wt. %) | 9.5 | 1.6 |
| K$_2$O (wt. %) | — | 5.6 |
| Al$_2$O$_3$ (wt. %) | 22.2 | 11.4 |
| SiO$_2$ (wt. %) | 64.4 | 78.7 |
| SiO$_2$/Al$_2$O$_3$ (molar) | 4.93 | 11.72 |
| Na$^+$/Al | 0.19 | 0.18 |
| NH$_4^+$Al | 0.84 | 0.27 |
| K$^+$/Al | — | 0.53 |
| Cation Equivalent (M$^+$/Al) | 1.03 | 0.98 |
| X-Ray Crystallinity: |  |  |
| By Peak Intensity | 100 | 44 |
| Unit Cell Dimension (a$_o$ in Å): | 24.712 | 24.514 |
| Framework Infrared: |  |  |
| Asymmetric Stretch, cm$^{-1}$: | 1015 | 1047 |
| Symmetric Stretch, cm$^{-1}$: | 787 | 799 |
| Hydroxyl Infrared: |  |  |
| Absolute Abs. at 3710 cm$^{-1}$ | — | 0.210 |
| Defect Structure Factor, z: | 0.000 | 0.089 |

The framework mole fractions of tetrahedra are set forth below for the starting NH$_4$Y and the LZ-210 product.
(a) Mole fraction of framework oxides (TO$_2$):

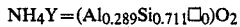

NH$_4$Y = (Al$_{0.289}$Si$_{0.711}$□$_0$)O$_2$

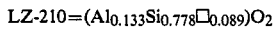

LZ-210 = (Al$_{0.133}$Si$_{0.778}$□$_{0.089}$)O$_2$ (b) Mole fraction of aluminum removed; N: 0.156
(c) % framework aluminum removed; N/a × 100: 54
(d) Change in defect structure factor; Δz: 0.089
(e) Moles of silicon substituted per mole of aluminum removed; (N−Δz)/N: 0.43

In addition to the above described properties, the crystal collapse temperature of the LZ-210 product as measured by the standard DTA procedure was at 1072° C. The untreated NH$_4$Y crystal collapse temperature measured by the same DTA technique was at 890° C.

EXAMPLE 12

Ten gm. (anhydrous weight) of ammonium zeolite Y (SiO$_2$/Al$_2$O$_3$ ratio=4.93) were slurried in 100 ml of 3.5 molar ammonium acetate solution at 75° C. A 50 ml. solution of water containing 6.63 grams of MgSiF$_6$·6-H$_2$O was added to the slurry in increments of 1 ml. at a rate of 1 ml. every 5 minutes. Following addition of the MgSiF$_6$ solution the reaction mixture was digested 17 hours at 75° C., with stirring. After the digestion period, the reaction mixture was filtered and the filter cake thoroughly washed with distilled water until tests of the wash water proved negative for both fluoride and aluminum ions. The X-ray powder pattern obtained on the product showed the presence of a substantial amount of (NH$_4$)MgAlF$_6$ in the product. The fluoride containing product was Soxhlet extracted with water for 60 hours with the result that a negligible amount of NH$_4$MgAlF$_6$ was removed from the product. Wet chemical analyses and X-ray powder diffraction both indicated that the product was a mixture of 85% zeolite and 15% NH$_4$MgAlF$_6$. The chemical and other analyses for the starting NH$_4$Y zeolite and the LZ-210 product zeolite are set forth below:

|  | NH$_4$Y | LZ-210 Product |
|---|---|---|
| As prepared: |  |  |
| Na$_2$O (wt. %) | 2.5 | 0.6 |
| (NH$_4$)$_2$O (wt. %) | 9.5 | 3.2 |
| MgO (wt. %) | — | 6.9 |
| Al$_2$O$_3$ (wt. %) | 22.2 | 15.2 |
| SiO$_2$ (wt. %) | 64.4 | 65.6 |
| SiO$_2$/Al$_2$O$_3$ (molar) | 4.93 | 7.30 |
| F$_2$ (wt. %) | none | 9.2 |
| Corrected for 15 wt. % NH$_4$MgAlF$_6$: |  |  |
| SiO$_2$Al$_2$O$_3$: | 4.93 | 9.93 |
| Cation Equivalent (M$^+$/Al): | 1.03 | 1.12 |
| X-ray Crystallinity (%) | 100 | 100 |
| Unit Cell Dimension (a$_o$ in Å): | 24.712 | 24.454 |
| Framework Infrared: |  |  |
| Asymmetric Stretch, cm$^{-1}$ | 1015 | 1045 |
| Symmetric Stretch, cm$^{-1}$ | 787 | 811 |
| Hydroxyl Infrared: |  |  |
| Absolute Abs. at 3710 cm$^{-1}$ | 0.000 | 0.077 |
| Defect Structure Factor, z: | 0.00 | 0.033 |

The framework mole fractions of tetrahedra are set forth below for the starting NH$_4$Y and the LZ-210 product which has been corrected for the presence of 15 wt.% NH$_4$MgAlF$_6$.
(a) Mole fraction of framework oxides (TO$_2$):

NH$_4$ = (Al$_{0.289}$Si$_{0.711}$□$_{0.000}$)O$_2$

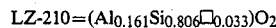

LZ-210 = (Al$_{0.161}$Si$_{0.806}$□$_{0.033}$)O$_2$ (b) Mole fraction of aluminum removed; N: 0.128
(c) % framework aluminum removed; N/a × 100: 44
(d) Change in defect structure factor, Δz: 0.033
(e) Moles of silicon substituted per mole of aluminum removed; (N−Δz)/N: 0.74

EXAMPLE 13

(a) The novel zeolite compositions of the present invention are useful in adsorption, ion-exchange and catalytic processes in which their less siliceous precursors have heretofore been suitably employed. In general, because they are more highly siliceous than their precursors they are not only more thermally and hydrothermally stable than those prior known materials but also have increased resistance toward acidic agents such as mineral and organic acids, SO$_2$, SO$_3$, NO$_X$ and the like. These new zeolites are thus highly useful as selective adsorbents for these materials from, gas streams containing same, e.g., gas streams from sulfuric acid plants. Also since their crystal structures are notably low in defect structure and the zeolitic cations are ion-exchangeable for other cation species, both metallic and non-metallic, these zeolite compositions are readily tailored by known methods to suit the requirements of a broad spectrum of catalyst compositions, particularly hydrocarbon conversion catalysts. The non-metallic cation sites can also be thermally decationized in the known manner to produce the highly acidic zeolite forms favored in many hydrocarbon conversion reactions.

The novel zeolites of this invention can be compounded into a porous inorganic matrix such as silica-alumina, silica-magnesia, silica-zirconia, silica-aluminathoria, silica-alumina-magnesia and the like. The relative proportions of finely divided zeolite and inorganic matrix can vary widely with zeolite content ranging from about 1 to 90 percent by weight, preferably from about 2 to about 50 percent by weight.

Among the hydrocarbon conversion reactions catalyzed by these new compositions are cracking, hydrocracking, alkylation of both the aromatic and isoparaffin types, isomerization including xylene isomerization, polymerization, reforming, hydrogenation, dehydrogenation, transalkylation and dealkylation, and catalytic dewaxing.

Using these zeolite catalyst compositions which contain a hydrogenation promoter such as platinum or palladiu, heavy petroleum residual stocks, cyclic stocks and other hydrocrackable charge stocks can be hydrocracked at temperatures in the range of 400° F. to 825° F. using molar ratios of hydrogen to hydrocarbon in the range of between 2 and 80, pressures between 10 and 3500 p.s.i.g., and a liquid hourly space velocity (LHSV) of from 0.1 to 20, preferably 1.0 to 10.

The catalyst compositions employed in hydrocracking are also suitable for use in reforming processes in which the hydrocarbon feedstocks contact the catalyst at temperatures of from about 700° F. to 1000° F., hydrogen pressures of from 100 to 500 p.s.i.g., LHSV values in the range of 0.1 to 10 and hydrogen to hydrocarbon molar ratios in the range of 1 to 20, preferably between 4 and 12.

These same catalysts, i.e., those containing hydrogenation promoters, are also useful in hydroisomerization processes in which feedstocks such as normal paraffins are converted to saturated branched chain isomers. Hydroisomerization is carried out at a temperature of from about 200° F. to 600° F., preferably 300° F. to 550° F. with an LHSV value of from about 0.2 to 1.0. Hydrogen is supplied to the reactor in admixture with the hydrocarbon feedstock in molar proportions (H/Hc) of between 1 and 5.

At somewhat higher temperatures, i.e., from about 650° F. to 1000° F., preferably 850° F. to 950° F. and usually at somewhat lower pressures within the range of about 15 to 50 p.s.i.g., the same catalyst compositions are used to hydroisomerize normal paraffins. Preferably the paraffin feedstock comprises normal paraffins having a carbon number range of $C_7$–$C_{20}$. Contact time between the feedstock and the catalyst is generally relatively short to avoid undesirable side reactions such as olefin polymerization and paraffin cracking. LHSV values in the range of 0.1 to 10, preferably 1.0 to 6.0 are suitable.

The increase in the molar $SiO_2/Al_2O_3$ ratios of the present zeolite compositions favor their use as catalysts in the conversion of alkylaromatic compounds, particularly the catalytic disproportionation of toluene, ethylene, trimethyl benzenes, tetramethylbenzenes and the like. In the disproportionation process isomerization and transalkylation can also occur. Advantageously the catalyst form employed contains less than 1.0 weight percent sodium as $Na_2O$ and is principally in the so-called hydrogen cation or decationized form. Group VIII noble metals adjuvents alone or in conjunction with Group VI-B metals such as tungsten, molybdenum and chromium are preferably included in the catalyst composition in amounts of from about 3 to 15 weight % of the overall composition. Extraneous hydrogen can, but need not be present in the reaction zone which is maintained at a temperature of from about 400° to 750° F., pressures in the range of 100 to 2000 p.s.i.g. and LHSV values in the range of 0.1 to 15.

Catalytic cracking processes are preferably carried out using those zeolites of this invention which have $SiO_2/Al_2O_3$ molar ratios of 6 to 20, less than 1.0 weight % $Na_2O$ and feedstocks such as gas oils, heavy naphthas, deasphalted crude oil residua, etc. with gasoline being the principal desired product. The decationized form of the zeolite and/or polyvalent metal cationic form are advantageously employed. Temperature conditions of 850° to 1100° F., LHSV values of about 0.5 to about 10 and pressure conditions of from about 0 to about 50 p.s.i.g. are suitable.

Dehydrocyclization reactions employing paraffinic hydrocarbon feedstocks, preferably normal paraffins having more than 6 carbon atoms, to form benzene, xylenes, toluene and the like are carried out using essentially the same reaction conditions as for catalytic cracking. The preferred form of the zeolite employed as the catalyst is that in which the cations are principally metals of Group II-A and/or II-B such as calcium, strontium, magnesium. Group VIII non-noble metal cation can also be employed such as cobalt and nickel.

In catalytic dealkylation wherein it is desired to cleave paraffinic side chains from aromatic nuclei without substantially hydrogenating the ring structure, relatively high temperatures in the range of about 800°–1000° F. are employed at moderate hydrogen pressures of aabout 300–1000 p.s.i.g., other conditions being similar to those described above for catalytic hydrocracking. Prefered catalysts are of the relatively non-acidic type described above in connection with catalytic dehydrocyclization. Particularly desirable dealkylation reactions contemplated herein include the conversion of methylnaphthalene to naphthalene and toluene and/or xylenes to benzene.

In catalytic hydrofining, the primary objective is to promote the selective hydrodecomposition of organic sulfur and/or nitrogen compounds in the feed, without substantially affecting hydrocarbon molecules therein. For this purpose it is preferred to employ the same general conditions described above for catalytic hydrocracking, and catalysts of the same general nature described in connection with dehydrocyclization operations. Feedstocks include gasoline fractions, kerosenes, jet fuel fractions, diesel fractions, light and heavy gas oils, deasphalted crude oil residua and the like any of which may contain up to about 5 weight-percent of sulfur and up to about 3 weight-percent of nitrogen.

Similar conditions can be employed to effect hydrofining, i.e., denitrogenation and desulfurization, of hydrocarbon feeds containing substantial proportions of organoitrogen and organosulfur compounds. As observed by D. A. Young in U.S. Pat. No. 3,783,123, it is generally recognized that the presence of substantial amounts of such constituents markedly inhibits the activity of catalysts for hydrocracking. Consequently, it is necessary to operate at more extreme conditions when it is desired to obtain the same degree of hydrocracking conversion per pass on a relatively nitrogeneous feed than are required with a feed containing less organonitrogen compounds. Consequently, the conditions under which denitrogenation, desulfurization and/or hydrocracking can be most expeditiously accomplished in any given situation are necessarily determined in view of the characteristics of the feedstocks, in particular the concentration of organonitrogen compounds in the feedstock. As a result of the effect of organonitrogen compounds on the hydrocracking activity of these compositions it is not at all unlikely that the conditions most suitable for denitrogenation of a given feedstock having a relatively high organonitrogen content with minimal hydrocracking, e.g., less than 20 volume percent of fresh feed per pass, might be the same as those preferred for hydrocracking another feedstock having a loswer concentration of hydrocracking inhibiting constituents, e.g., organonitrogen compounds. Consequently, it has become the practice in this art to establish the conditons under which a certain feed is to be contacted on the basis of preliminary screening tests with the specific catalyst and feedstocks.

Isomerization reactions are carried out under conditions similar to those described above for reforming, using somewhat more acidic catalysts. Olefins are preferably isomerized at temperatures of 500°–900° F., while paraffins, naphthenes and alkyl aromatics are isomerized at temperatures of 700°–1000° F. Particularly desirable isomerization reactions contemplated herein include the conversion of n-heptane and/or n-octane to isoheptanes, iso-octanes, butane to iso-butane, methylcyclopentane to cyclohexane, meta-xylene and/or ortho-xylene to para-xylene, 1-butene to 2-butene and/or isobutene, n-hexene to isohexene, cyclohexene to methyl-cyclopentene, etc. The preferred cation form of the zeolite catalyst is that in which the ion-exchange capacity is about 50–60 percent occupied by polyvalent metals such as Group II-A, Group II-B and rare earth metals, and 5 to 30 percent of the cation sites are either decationized or occupied by hydrogen cations.

For alkylation and dealkylation processes the polyvalent metal cation form of the zeolite catalyst is preferred with less than 10 equivalent percent of the cations being alkali metal. When employed for dealkylation of alkyl aromatics, the temperature is usually at least 350° F. and ranges up to a temperature at which substantial cracking of the feedstock or conversion products occurs, generally up to about 700° F. The temperature is preferably at least 450° F. and not greater than the critical temperature of the compound undergoing dealkylation. Pressure conditions are applied to retain at least the aromatic feed in the liquid state. For alkylation the temperature can be as low as 250° F. but is preferably at least 350° F. In alkylating benzene, toluene and xylene, the preferred alkylating agents are olefins such as ethylene and propylene.

The hydrothermal stability of many of the zeolite compositions of this invention can be enhanced by conventional steaming procedures. In general the ammonium or hydrogen cation forms of the zeolite are contacted with steam at a water vapor pressure of at least about 0.1 psia, preferably at least 0.2 psia up to several atmospheres. Preferably steam at one atmosphere is employed. The steaming temperatures range from 100° C. up to the crystal destruction temperature of the zeolite, but are preferably in the range of 600° C. to 850° C. Steaming periods of a few minutes, e.g., 10 minutes, up to several hours can be employed depending upon the specific temperature conditions. The steaming also produces changes in the selectivity of the catalyst in many cases.

In the above-described catalytic conversion processes the preferred form of the LZ-210 zeolite catalysts are those in which the zeolite constituent has pores of sufficient diameter to adsorb benzene.

(b) In order to evaluate the catalytic activity of LZ-210 in the catalytic cracking of a gas oil feedstock, a sample of the catalyst was prepared as follow: 990 g. $(NH_4)_2SiF_6$ were dissolved with stirring into 3.8 liters of distilled water at 50° C. The solution was put into a dropping funnel fitted on a three-necked round-bottom flask. A solution of 1500 grams of ammonium acetate in 10 liters of water was then added to the flask. Ammonium zeolite Y in the amount of 2500 grams (anhydrous weight, molar $SiO_2/Al_2O_3=4.87$) was slurried up in the ammonium acetate solution at 75° C. A mechanical stirrer was fitted to the center hole of the flask, which was also fitted with the necessary thermocouples and temperature controllers. Addition of the 3.8 liters of $(NH_4)_2SiF_6$ solution in 100 ml. increments was begun with a 5-minute interval between each addition. The initial pH of the slurry was measured at 5.74 and after all of the $(NH_4)_2SiF_6$ solution was added the pH of the slurry was 5.38. The mixture was heated at 95° C. with stirring for an additional 18 hours, the dropping funnel having been replaced with a condenser. The stoichiometry of the reaction was of the order of one Si added as $(NH_4)_2SiF_6$ for every two Al atoms prsent in the zeolite. At the conclusion of the reaction the pH of the slurry was 5.62. The reaction mixture was then filtered and the solids washed with about 25 liters of hot distilled water, until quantitative tests indicated absence of $NH_3$ and aluminum in the effluent wash water. It was then dried 2 hours at 110° C. The product had a unit cell dimension ($a_o$) of 24.41 A, a cation equivalence of 0.94, and the following compositional mole ratios:

$Na_2O/Al_2O_3=0.076$ $(NH_4)_2O/Al_2O_3=0.862$ $SiO_2/Al_2O_3=9.87$

The powdered LZ-210 was admixed with 1.5 times its weight of alumina and formed by means of extrusion into 1/16 inch pellets. The pellets were calcined at 500° C. for 6 hours. The resulting extrudates were sized to 60–100 mesh and evaluated for cracking activity using a gas oil feedstock, (Amoco FHC-893), in accordance with the procedure of ASTM test method No. D-032,04. The following results were obtained:

| ASTM Conversion | 86.0 |
|---|---|
| Gas[1] | 35.0 |
| Gasoline[2] | 28.5 |
| Coke[3] | 8.89 |
| $H_2$ | 0.14 |
| $C_1$ | 0.38 |
| $C_2 + C_2=$ | 1.3 |
| $C_3$ | 2.5 |
| $C_3=$ | 2.6 |
| $i-C_4$ | 6.5 |
| $n-C_4$ | 3.2 |
| $C_4=$ | 10.8 |
| $C_5$ | 5.1 |
| $C_5=$ | 2.5 |

[1] weight % feed converted to gas
[2] Gasoline-wt. product (180° F.–421° F.) /Total product
[3] Weight % feed converted to coke (gravimetric)

EXAMPLE 14

A sample of LZ-210 having a $SiO_2/Al_2O_3$ molar ratio of 9.6 and containing 0.7 weight % $Na_2O$ was loaded with 0.53 weight percent palladium and composited with sufficient alumina to form an 80% Pd/LZ-210-20% $Al_2O_3$ catalyst composition having an average bulk density of 0.48 cc./g. This catalyst composition was tested for gasoline hydrocracking performance using the following test conditions:

Feedstock-Gas Oil, °API-39.0, BP.R=316°-789° F.
Pressure-1450 psig.
$H_2$/Oil-8000 SCF/BBL.

To determine the second stage hydrogenation activity of the catalyst, the feed was doped with 5000 ppm sulfur as throphene. The activity in this regard was, in terms of the temperature required to obtain a 49.0 °API product after 100 hours in stream, 498° F. To determine the first stage (cracking) activity, the feed was dopd with 5000 ppm sulfur as thiophene and 2000 ppm nitrogen as 5-butylamine. The activity in this regard, in terms of the temperature required to obtain a 47.0 °API product after 100 hours on stream, was 692° F.

EXAMPLE 15 (COMPARATIVE)

(a) The process described in U.S. Pat. No. 3,640,681 for extracting aluminum from the framework of zeolite Y was repeated using a 47% ammonium-exchanged zeolite Y having a $SiO_2/Al_2O_3$ molar ratio of 4.99. Chemical and physical analyses of the $NH_4Y$ gave the following:

| | |
|---|---|
| $Na_2O$ (wt. %) | 7.13 |
| $(NH_4)_2O$ (wt. %) | 5.37 |
| $Al_2O_3$ (wt. %) | 22.26 |
| $SiO_2$ (wt. %) | 65.52 |
| $Na^+/Al$ | 0.53 |
| $NH_4^+/Al$ | 0.47 |
| $M^+/Al$ | 1.00 |
| $SiO_2/Al_2O_3$ (molar) | 4.99 |
| Relative Crystallinity (%): | 100 |
| Asymmetric Stretch, $cm^{-1}$: | 1018 |
| Symmetric Stretch, $cm^{-1}$: | 788 |
| Defect Structure (z): | 0.0021 |

The $NH_4Y$ was calcined at 550° C. in air and aluminum extracted with acetylacetonate according to the procedure described in U.S. Pat. No. 3,640,681. The acetylacetonate extraction was carried out for sufficient time to give a product having a $SiO_2/Al_2O_3$ ratio of about 8.5. Chemical analysis of the acetylacetonate extracted $NH_4Y$ gave the following results:

| | |
|---|---|
| $Na_2O$ (wt. %) | 7.85 |
| $(NH_4)_2O$ (wt. %) | <0.05 |
| $Al_2O_3$ (wt. %) | 15.15 |
| $SiO_2$ (wt. %) | 76.72 |
| $Na^+/Al$ | 0.85 |
| $NH_4^+/Al$ | 0 |
| $M^+/Al$ | 0.85 |
| $SiO_2/Al_2O_3$ (molar) | 8.59 |
| Retained Crystallinity (%): | 62 |
| Asymmetric Stretch, $cm^{-1}$: | 1037 |
| Symmetric Stretch, $cm^{-1}$: | 792 |
| Defect Structure, (z): | 0.189 |

The retained crystallinity vaue, calculated from the X-ray powder diffraction patterns of the starting and product materials, was 62%, relative to the starting NaY. The asymmetric strech band shifted 17 $cm^{-1}$ relative to the 47% $NH_4^+$ exchanged NaY while the symmetric strech band shifted 4 $cm^{-1}$ relative to the 47% $NH_4^+$ exchanged NaY. These strech band shifts are indicative of dealumination only of the $NH_4Y$ starting material.

(b) The acetylacetonate extracted-calcined $NH_4Y$ product of part (a) (denominated herein as "YAcAc") and two LZ-210 zeolites, respectively having $SiO_2/Al_2O_3$ ratios of 6.5 and 9.0, were evaluated for catalytic activity according to the Micro Activity Test (MAT) described in ASTM test method D-3907. The LZ-210 zeolites were prepared according to this invention and were ammonium ion-exchanged to reduce the $Na_2O$ content to about 0.8 weight percent, which was comparable to the $Na_2O$ content of the product of part (a), above. Three catalysts were prepared by preparing slurries containing: 20 wt.% of the selected zeolite; 5 wt.% of an aqueous silica sol (40 wt.% silica); 18 wt.% of a pseudobeohmite alumina; and 62 wt.% of a kaolin clay. The slurries were spray dried to provide an average particle size of 60 to 70 microns. The catalysts were then steam deactivated in 100% steam for 2 hours at one of the temperatures set forth in the table below. The steam deactivation procedure simulates the environment experienced by a cracking catalyst during commercial use. The weight percent conversion is as defined in ASTM test method D-3907. The gasoline selectivity is the weight percent of the feedstock converted to products boiling from $C_5$ to 420° F.

| Steam Deactivation Temp. (°F) | Wt. % Conversion of Zeolite Catalyst | | |
|---|---|---|---|
| | YAcAc | LZ-210 (6.5) | LZ-210 (9.0) |
| 1400° F. | 63.60 | 74.68 | 72.85 |
| 1500° F. | 61.22 | 73.62 | 70.29 |
| 1550° F. | — | 68.62 | 63.98 |

The above data show that both LZ-210-containing catalysts gave a higher weight percent conversion than the catalyst containing the acetylacetonate extracted zeolite Y. Further, this improvement in conversion was observed to occur without a significant loss in gasoline selectivity.

EXAMPLE 16 (COMPARATIVE)

This is a comparative example detailing the preparation and evaluation of the synthetic aluminosilicate zeolites disclosed in U.K. Pat. No. 1,431,944. The synthetic aluminosilicate zeolites of U.K. Pat. No. 1,431,944 are disclosed to be of the faujasite type having silica-to-alumina molar ratios between 5.5 and 8.0 (page 2, column 1, lines 49 to 50). The basis for determination of the silica-to-alumina mole ratios in U.K. Pat. No. 1,431,944 essentially relies on measurement of the unit cell parameter $a_o$.

The dimensions of the fundamental building blocks in a crystal are given as unit cell dimensions $a_o$, $b_o$ and $c_o$. Since zeolites X and Y are cubic all three dimensions of the unit cell are equal and the unit cell dimensions are listed simply as the $a_o$. The $a_o$ has been related to the silica-to-alumina mole ratio of zeolites X and Y in certain circumstances by use of the relationship developed by Breck and Flanigen and described in London Conference on Molecular Sieves, Soc. Chem. Ind., 1968, at page 53. The Breck-Flanigen relationship correlates the $a_o$ to the silica-to-alumina mole ratio as follows:

$$Si/Al_2 = \frac{(1.666 - 1)}{a_o - 24.191} \times 2$$

wherein $a_o$ is the unit cell parameter in Angstroms. The Breck-Flanigen relationship can be employed to determine the $Si/Al_2$ ratio from the $a_o$ when such is employed to determine the $Si/Al_2$ ratio of fully hydrated sodium X and sodium Y zeolites. The unit cell parameter $a_o$ is determined by X-ray diffraction measurements.

The $a_o$ is generally measured and used in conjunction with chemical analysis data to aid in the determination of the relative purity of the zeolite X and Y samples. Under certain circumstances the $a_o$ is used to calculate the silica-to-alumina mole ratio of the aluminosilicate zeolite. During synthesis it is not uncommon that amorphous silica, alumina or silica-alumina is collected with the zeolite product. Since the Breck-Flanigen relationship was derived from what were considered to be relatively pure zeolite X and zeolite Y samples, the $a_o$ can be used as an aid in evaluating the purity of the zeolites X and Y, and hence the silica-to-alumina mole ratio in the crystal framework. However, the Breck-Flanigen relationship was never meant to be a substitute for standard methods of analysis for other than fully hydrated sodium X and Y zeolites.

There are many factors which affect the unit cell size. Certainly, increasing the silicon content of the crystal framework will reduce the unit cell size, since the average silicon-oxygen bond distance is shorter than the average aluminum-oxygen bond distance. Conversely, increasing the aluminum content of the crystal framework will increase the unit cell size for the same reason; Al-O is longer than Si-O. If these were the only factors governing the size of the unit cell, the Breck-Flanigen relationship would then be a true measure of the framework Si/Al ratio. But there are other factors which also affect the size of the unit cell such as the cation which balances the framework negative charges on the $AlO_4^-$ tetrahedra and the level of hydration-dehydration of the zeolite crystals. Cation size, as well as the size of the hydration sphere surrounding the cation, will cause an increase or decrease in the unit cell size. Larger cations or cations with large hydration spheres will cause the unit cell to expand. Similarly, water adsorbed into the channels and voids of the zeolite will cause the unit cell to expand where the unit cell of a dehydrated zeolite will contract. Dehydration and/or calcination at higher temperatures may also cause movement of cations within the zeolite structue and this is also known to have an effect on the unit cell dimension. The observed expansions and contractions of the unit cell resulting from a change in cation size and hydration sphere, the degree of hydration of the zeolite crystal and movement of cations in no way reflect a change in the framework silica-to-alumina ratio. The thermal history of the zeolite sample will effect the $a_o$ of the zeolite sample. For example, the calculated $SiO_2/Al_2O_3$ ratio of a hydrated NaY zeolite with a unit cell value of 24.63 Angstroms is 5.59 by using the Breck-Flanigen equation. Dehydrating the same NaY zeolite may cause a reduction in the unit cell value to 24.51 Angstroms. The Breck-Flanigen equation would indicate that the framework $SiO_2/Al_2O_3$ ratio had increased to 8.45. Of course, the silica-to-alumina ratio of the NaY has not increased due to the dehydration process. Since dehydration of the zeolites X and Y results in significant decreases in the measured unit cell value ($a_o$), reliance on only the $a_o$ of the product without resort to proper measurement procedures to determine the silica-to-alumina mole ratio is of questionable reliability. These observations become important in view of the fact that the examples of U.K. patent specification No. 1,431,944 essentially relied on the $a_o$ measurement of dehydrated zeolites in order to compute the silica-to-alumina ratio of the zeolite framework. Accordingly, examples of U.K. Pat. No. 1,431,944 were repeated to evaluate the relationship of the drying procedure employed in the patent (all U.K. Pat. No. 1,431,944 products were dried at 100° C. in air for three hour's prior to measurement of the $a_o$) to the measured $a_o$ values and calculated silica-to-alumina mole ratios.

Certain examples of U.K. Pat. No. 1,431,944 were repeated to evaluate the observed effect of the drying procedures of the patent on the calculated $SiO_2$ to $Al_2O_3$ ratio of the zeolite framework as calculated by the Breck-Flanigen equation. Zeolites described in U.K. Pat. No. 1,431,944 (denominated therein as "Zeolite 529") were prepared and evaluated in a dried (dehydrated) state and after rehydration to demonstrate that measurement of the unit cell of dehydrated Zeolite 529 samples results in erroneously low $a_o$ values and a correspondingly high calculated $SiO_2$ to $Al_2O_3$ molar ratio. In fact, the effect of dehydration on the $a_o$ is readily demonstrated by reference to examples already described in U.K. Pat. No. 1,431,944. The Zeolite 529 sample of example V was prepared according to the procedure of example IV which included a final drying step at 110° C. in air for 3 hours. The $a_o$ was measured on the dried product. Example V discloses this Zeolite 529 product had an $a_o$ of 24.51 (calculated $SiO_2/Al_2O_3$ mole ratio of 6.2), but this is probably an error and the $a_o$ was probably 24.58 as reported for the sample in example IV to which example V refers. This zeolite was employed in two catalysts formulations (A and B) which differed only in that Catalyst A was calcined in air for 16 hours at 750° C. while Catalyst B was calcined in 1 atm. of steam for 16 hours at 650° C. In both instances the $a_o$ of the Zeolite 529 component of the catalyst is reported to have decreased as a result of the thermal or hydrothermal treatment. (See Table IV on page 8 of U.K. Pat. No. 1,431,944) wherein Catalyst A was reported to have an $a_o$ value of 24.46 (calculated $SiO_2/Al_2O_3$ mole ratio of 10.39) while Catalyst B had an $a_o$ of 24.30 (calculated $SiO_2/Al_2O_3$ mole ratio of 28.58). It is clear that the thermal history of each sample had a dramatic effect on the $a_o$ of the samples and the calculated $SiO_2/Al_2O_3$ ratio.

Since all the $a_o$ values of the Zeolite 529 samples of U.K. Pat. No. 1,431,944 were reported as a result of measurement of thermally treated and dehydrated samples, selected examples from U.K. Pat. No. 1,431,944 were repeated to determine the relationship between the $a_o$ of dehydrated Zeolite 529 samples, the $a_o$ of the same samples after rehydration and the chemical analysis of the samples.

(A) Example I of U.K. Pat. No. 1,431,944:

Whereas U.K. Pat. No. 1,431,944 does not report the chemical analyses of the zeolite 529 products and relies solely on the $a_o$ measurement of the dried products the following examples provide $a_o$ and chemical analyses of the prepared products. Example I, preparation 1 of U.K. Pat. No. 1,431,944 was repeated as follows:

(1) A "faujasite precursor" solution was prepared having a composition, in terms of molar ratios of oxides as follows:
$Na_2O/SiO_2$: 1.9
$SiO_2/Al_2O_3$: 15.2
$H_2O/Na_2O$: 18.2
This faujasite precursor solution was prepared by mixing 80.2 grams of NaOH in 320 grams of water. To this mixture was added 10.1 grams of sodium aluminate. Sodium silicate (140.6 grams) was added to this mixture and the resulting mixture mixed and heated at 60°-64° C. for 0.5 hours. The mixture was observed to be slightly turbid at the end of the 0.5 hour period.
(2) A "silicate solution" was prepared by adding 1000.8 grams of sodium silicate (N grade) to 700 grams of water. The mixture was stirred for 5 to 10 minutes.
(3) The faujasite precursor solution was added to the silicate solution and the resulting mixture blended for 10 minutes.
(4) An "aluminium salt solution" was prepared by dissolving 77.6 grams of $AlCl_3 \cdot 6H_2O$ in 675.1 grams of water with stirring.
(5) The aluminium salt solution was added to the mixture of step (3) with stirring to form a white gel. The mixture was stirred for one minute.
(6) The resulting mixture of step (5) was divided into four equal portions and each portion heated at 100° C. for one hour by placing the four portions in an oven heated to 100° C.
(7) The four portions were removed from the oven and recombined. The mixture was filtered and a filter cake obtained. The filter cake was then mixed with 25 grams of water and placed into a TEFLON lined container and heated quiescently at 100° C. for 3 days. The mixture was then filtered and the solid product washed until the pH of the wash water was less than pH 11.
(8) The final solid product of step (7) was dried at 110° C. for 3 hours and labeled "Sample A".
(9) The dried product of step (8), i.e., Sample A, was analyzed by X-ray and observed to contain (by area) 91 percent Zeolite Y and the remainder was zeolite Pc. The area percent was determined by use of Siemens D-500 X-ray pattern by comparison of all zeolite Y peaks to a standard Y zeolite, assumed to be 100% crystalline. The $a_o$ of the dried sample was 24.638 Å, unstripped of $K\alpha 2$. The $Si/Al_2$ ratio was calculated using the Breck and Flanigen equation and corresponds to a $Si/Al_2$ ratio of 5.45. Example I of U.K. Pat. No. 1,431,944 reported the $a_o$ of this sample as 24.580 Å and was stated to give an $Si/Al_2$ ratio of 6.2. Calculation of the $Si/Al_2$ ratio using an $a_o$ of 24.580 Å using the Breck and Flanigen equation actually gives a $Si/Al_2$ ratio of 6.6.

Chemical and physical data for the Zeolite 529 product of U.K. Pat. No. 1,431,944 (preparation 1 of example 1) and for Sample A were as follows:

|  | Ex. 1 of U.K. Patent No. 1,431,944 | Sample A |
|---|---|---|
| Unit cell size, $a_o$ in Å (dried at 110° C. for 3 hours): | 24.58 | 24.638 |
| Calculated $SiO_2/Al_2O_3$ ratio | 6.57 | 5.46 |

|  | Ex. 1 of U.K. Patent No. 1,431,944 | Sample A |
|---|---|---|
| of dried product from $a_o$: | | |

(B) Example I of U.K. Pat. No. 1,431,944:

The procedure described above in part (a) was repeated two additional times with the following modifications;
(1) The first repetition of the procedure of part (a) was carried out by substituting sodium orthosilicate for sodium silicate in the faujasite precursor solution and in the silicate solutions. Further, the $H_2O/Na_2O$ molar oxide ratio in the faujasite precursor solution was increased from 18:1 to 26:1. The increase in the molar amount of water was required to dissolve the components of the mixture. No NaOH was added to the faujasite precursor solution since $Na_2O$ was present from the use of sodium orthosilicate. Further the mixture of step (6) was divided into two portions in step (7) instead of four portions. One portion was heated for one hour in a 100° C. boiling water bath and labeled "Sample B" and one portion heated as in part (a) for one hour and labeled "Sample C". The portion heated in the water bath (Sample B) formed a solid product after 50 hours. The solid product was dried at room temperature (about 25° C.) and hydrated for 36 hours at 82% relative humidity at room temperature. The $a_o$ of this product was measured and determined to be 24.656 Å ($SiO_2/Al_2O_3 = 5.17$). The second portion (Sample C) was heated in an oven at 100° C. for 48 hours, dried at room temperature and hydrated for 36 hours at 82% relative humidity. The $a_o$ was measured and determined to be 24.657 Å ($SiO_2/Al_2O_3 = 5.15$). Both samples were observed to contain zeolite Y and zeolite Pc.
(2) The procedure described above in part (1) was repeated using sodium metasilicate in place of the sodium orthosilicate employed in part (1), above. The product obtained from the portion heated in the boiling water bath was obtained after 52 hours instead of the 50 hours of part (1) and labeled Sample D. The $a_o$ of the product obtained from the portion heated in the water bath and dried at room temperature was 24.660 Å ($SiO_2/Al_2O_3 = 5.1$). The $a_o$ of the product obtained from the portion heated in the oven and hydrated at 82% relative humidity for 36 hours was 24.659 Å ($SiO_2/Al_2O_3 = 5.12$) and was labeled Sample E.

Chemical and physical data for the Zeolite 529 products reported in preparations 2 and 3 of example 1 of U.K. Pat. No. 1,431.844 and for Samples B, C, D and E were as follows:

|  | U.K. Patent (Preparation 2) | (Sample B) | (Sample D) | U.K. Patent (Preparation 3) | (Sample C) | (Sample E) |
|---|---|---|---|---|---|---|
| $a_o$ in Å (dried at 25° C.) | — | 24.656 | 24.660 | — | 24.657 | 24.646 |
| $SiO_2/Al_2O_3$ Calculated from $a_o$* | — | 5.17 | 5.11 | 7.6 | 5.15 | 5.12 |
| $SiO_2/Al_2O_3$ ratio from chemical analysis | 6.8** | 5.31 | 5.38 | 7.8** | 5.29 | 5.32 |
| $a_o$ in Å (dried at 110° for 3 hours) | | 24.613 | 24.583 | — | 24.583 | 24.599 |

-continued

|  | U.K. Patent (Preparation 2) | (Sample B) | (Sample D) | U.K. Patent (Preparation 3) | (Sample C) | (Sample E) |
|---|---|---|---|---|---|---|
| $SiO_2/Al_2O_3$ (calculated from $a_o$ of dried sample) | — | 5.90 | 6.50 | — | 6.50 | 6.17 |
| % Zeolite (based on % crystallinity) | — | 86 | 101 | — | 68 | 101 |

*$SiO_2/Al_2O_3$ reported for examples reported in U.K. Patent are based on $a_o$ derived from dehydrated samples, i.e., heated in air at 110° C. whereas Samples B, C, D and E were dried at 25° C.
**Chemical analysis was by x-ray fluoroescence.

(C) Examples II-6 and II-7 of U.K. Pat. No. 1,431,944:

Example II, zeolites II-6 and II-7, of U.K. Patent Specification No. 1,431,944 were prepared by following the procedure set forth in part (a), above, with the following modifications to the described procedure. First, the starting amounts were reduced by fifty percent and the $H_2O$ in the aluminum salt solution reduced by 65%. Second, in step (7) of the procedure of part (a) the filter cake was divided into two parts. The filter cake for zeolite II-6 was resuspended in 20% by weight water, based on the total water in the starting mixture. The filter cake for zeolite II-7 was resuspended in 40% by weight water, based on the total water in the starting mixture. The products were collected and dried as described in Example II of U.K. Pat. No. 1,431,944 and as similarly described in part (a), above. The product identified as zeolite II-6 was labeled Sample F, analyzed by x-ray and determined to be 97% (by area) zeolite Y with an $a_o$ of 24.610 Å ($SiO_2/Al_2O_3$=5.95). Bulk chemical analysis of the sample indicated a $SiO_2/Al_2O_3$ ratio of 5.53. The product identified as zeolite II-7 was labeled Sample G, analyzed by x-ray and determined to be 57% (by area) zeolite Y with an $a_o$ of 24.592 ($SiO_2/Al_2O_3$=6.31). Bulk chemical analysis of the sample was carried out twice and indicated a $SiO_2/Al_2O_3$ ratio of 6.03 and 5.95, respectively. Portions of the product identified as Sample G were then rehydrated at 79% relative humidity to determine the effect on the $a_o$ resulting from the drying step at 110° C. One sample was rehydrated for 24 hours and found to have an $a_o$ of 24.590 Å ($SiO_2/Al_2O_3$=6.35). A second sample was rehydrated for 168 hours and the $a_o$ determined to be 24.627 Å ($SiO_2/Al_2O_3$=5.64).

Chemical and physical data for zeolites II-6 and II-7 of U.K. Pat. No. 1,431,944 were not reported. Samples F and G had the following chemical and physical data:

|  | Sample F | Sample G |
|---|---|---|
| % Zeolite Y: | 97 | 57 |
| $a_o$ in Å (dried at 110° C. in air for 3 hours): | 24.610 | 24.592 |
| $SiO_2/Al_2O_3$ ratio from $a_o$ (dried at 110° C. in air for 3 hours): | 5.95 | 6.31 |
| $SiO_2/Al_2O_3$ ratio (based on chemical analysis): | 5.53 | 6.03, 5.95* |
| $a_o$ in Å (dried sample rehydrated 24 hours in 79% relative humidity): | — | 24.590 |
| $SiO_2/Al_2O_3$ ratio (calculated from $a_o$ of 24 hours rehydrated sample): | — | 6.35 |
| $a_o$ in Å (dried sample rehydrated 168 hours in 79% relative humidity): | 24.5631 | 24.627 |
| $SiO_2/Al_2O_3$ (calculated from $a_o$ of 168 hour rehydrated sample): | 5.57 | 5.64 |

*Chemical analysis carried out in duplicate (D) Example IV of U.K. Pat. No. 1,431,944:

Example IV of U.K. Pat. No. 1,431,944 was repeated by following the procedure described in part (A) of this example and by increasing the amount of each component five fold. In addition, in step (7) the amount of water employed was 625 grams. The zeolite 529 product was dried at 110° C. in air for 3 hours and labeled Sample H. The $a_o$ of the zeolite 529 product was determined to be 24.621 Å ($SiO_2/Al_2O_3$=5.75). The sample was then hydrated for 108 hours in 79% relative humidity. The $a_o$ was measured and was 24.631 which corresponds to a $SiO_2/Al_2O_3$ ratio of 5.57. Chemical analysis of the hydrated product gave a $SiO_2/Al_2O_3$ ratio of 5.37.

Chemical and physical data for the zeolite of example 4 of U.K. Pat. No. 1,431,944 and Sample H were as follows:

|  | Ex. 4 of U.K. Patent No. 1,431,944 | Sample H |
|---|---|---|
| % Zeolite Y: | — | 128 |
| $a_o$ in Å (dried at 110° C. in air for 3 hours): | 24.58 | 24.621 |
| $SiO_2/Al_2O_3$ ratio from $a_o$ (dried at 110° C. in air for 3 hours): | 6.57 | 5.75 |

(E) Example II-7 of U.K. Pat. No. 1,431,944

Zeolite II-7 of U.K. Pat. No. 1,431,944 was again prepared as described above in part (C). To evaluate the effect of dehydration on the $a_o$ of the zeolite a series of hydration and dehydration tests were carried out as follows:

(a) A sample of zeolite II-7 (labeled Sample J) was dried at room temperature (25° C.) for 5 hours and then rehydrated for 40 hours at 82% relative humidity. The $a_o$ was measured and determined to be 24.636 Å ($SiO_2/Al_2O_3$=5.49). Chemical analyses of the product was carried out twice and gave $SiO_2/Al_2O_3$ ratios of 5.69 and 5.8.

(b) A portion of Sample J of part (a) was dried at 100° C. for 2 hours and placed in a deseccator to prevent rehydration before measurement of the $a_o$. Three sequential measurements of the $a_o$ of this sample gave values of 24.566Å ($SiO_2/Al_2O_3=6.89$), 24.571($SiO_2/Al_2O_3=6.77$) and 24.598Å ($SiO_2/Al_2O_3=6.19$).

The three sequential measurements of the sample were taken in air containing water vapor and demonstrate an increase in the $a_o$ of the sample as it hydrated during the course of the three measurements. The apparent effect on the $SiO_2/Al_2O_3$ ratio is that it decreased. Obviously, the $SiO_2/Al_2O_3$ ratio of the sample did not change.

(c) A portion of the dried Sample J of part (b) was then rehydrated for two hours at 50–55% relative humidity and the $a_o$ determined to be 24.600 ($SiO_2/Al_2O_3=6.15$). Bulk chemical analyses of the sample was carried out in duplicate and gave $SiO_2/Al_2O_3$ ratios of 5.80 and 5.69.

(d) Comparison of part (a), part (b) and part (c) demonstrates the dramatic effect that thermal treatment had on the $a_o$ of the sample. Part (b) demonstrates that the $a_o$ of the dried sample could not be correctly correlated to the actual $SiO_2/Al_2O_3$ mole ratio by use of the Breck-Flanigen equation. Part (c) demonstrates that rehydration at 50–55% relative humidity for 2 hours was an insufficient period to restore the $a_o$ to its predried value.

Example II-7 of U.K. Pat. No. 1,431,944 discloses the preparation of a "pure Zeolite 529". No Chemical or physical data are reported in the U.K. Patent for example II-7. Chemical and physical data for Sample J, as above described, were as follows:

|  | Sample J |
|---|---|
| % Zeolite Y: | 73* |
| $a_o$ in Å (dried at 25° C. in air for 5 hours and rehydrated in 82% relative humidity for 40 hours): | 24.636 |
| $SiO_2/Al_2O_3$ molar ratio from $a_o$ (dried at 25° C. in air for 5 hours and rehydrated in 82% relative humidity for 40 hours): | 5.49 |
| $a_o$ in Å (dried at 100° C. in air for 2 hours): | 24.571 |
| $SiO_2/Al_2O_3$ molar ratio from $a_o$ (dried at 100° C. in air for 2 hours): | 6.77 |
| $a_o$ in Å (dried at 100° C. in air for 2 hours and rehydrated at 50–55% relative humidity for 2 hours): | 24.600 |
| $SiO_2/Al_2O_3$ molar ratio from $a_o$ (dried at 100° C. in air for 2 hours and rehydrated at 50–55% relative humidity for 2 hours): | 6.15 |
| $a_o$ in Å (dried at 110° C. in air for 3 hours) | 24.583 |
| $SiO_2/Al_2O_3$ molar ratio from $a_o$ (dried at 110° C. in air for 3 hours): | 6.50 |
| $SiO_2/Al_2O_3$ molar ratio (from chemical analysis): | 5.80 |

*Zeolite Pc present (F) Discussion of Parts (A) to (E)

The results of parts (A) to (E) demonstrate the significant effect that the drying procedure in U.K. Pat. No. 1,431,944 has on the value of the unit cell parameter ($a_o$). The drying procedure of the U.K. Patent resulted in substantial shrinkage of the measured $a_o$ for each Zeolite 529 product and accordingly gave an incorrect correlation with the $SiO_2Al_2O_3$ ratios when the $a_o$ was employed to calculate the $SiO_2/Al_2O_3$ ratio by use of the Breck-Flanigen equation. Since U.K. Pat. No. 1,431,944 relies solely on measurement of the $a_o$ to determine the $SiO_2/Al_2O_3$ ratio and said $a_o$ measurements were performed on thermally treated samples, U.K. Pat. No. 1,431,944 fails to disclose the preparation of any product having a $SiO_2/Al_2O_3$ ratio greater than 6.0.

The effect of heating and dehydration on the unit cell value of NaY is most dramatically shown by Sample J in Part (E) above. The freshly synthesized NaY zeolite which had not been dried had an $a_o$ value of 24.636 corresponding to a $SiO_2/Al_2O_3$ ratio of 5.49, when calculated using the Breck-Flanigen equation. The actual value for the $SiO_2/Al_2O_3$ ratio by chemical analysis was 5.80. Since the determination of zeolite content of the sample gave a value of only 73% Y, it is obvious then that some amorphous material with a higher $SiO_2/Al_2O_3$ ratio is present giving rise to the 5.80 value. Nevertheless, when the sample was heated to 100° C. for only 2 hours, the $a_o$ value dropped to 24.571, corresponding to a $SiO_2/Al_2O_3$ ratio of 6.77. Obviously, the $SiO_2/Al_2O_3$ ratio of the zeolite 529 product did not increase as a result of drying at 100° C. Subsequent rehydration caused an increase in the $a_o$ value to 24.600, corresponding to a $SiO_2/Al_2O_3$ ratio of 6.15. It is also clear that the zeolite 529 product did not decrease in $SiO_2$ content merely as a result of hydration. The results of Parts (A) to (E) above show quite clearly that U.K. Patent Specification No. 1,431,944 fails to disclose the preparation of any Zeolite Y or synthetic faujasite product having a $SiO_2/Al_2O_3$ ratio in the zeolite framework greater than 6.0.

EXAMPLE 17 (COMPARATIVE EXAMPLE)

The zeolite denominated "ZSM-20" and disclosed in U.S. Pat. No. 3,972,983 was prepared and compared with faujasite to determine what relationship, if any, exists, U.S. Pat. No. 3,972,983 discloses that ZSM-20 has a $SiO_2/Al_2O_3>7$ and $<10$ and possesses a definite distinguishing hexagonal crystal structure whereas synthetic faujasites, e.g., zeolites X and Y, have cubic structures.

ZSM-20 was prepared according to U.S. Pat. No. 3,972,983 by mixing 7.9 grams of sodium aluminate, 300.2 ml. of a 2.71N aqueous solution of tetraethylammonium hydroxide and 62.8 grams of water. The mixture was blended for 3 minutes and placed in a beaker with stirring. Tetraethylorthosilicate (193.7 grams) was added to the above mixture over a 15 minute period during which a gel was formed. The gel was broken up with stirring and the resulting slurry stirred for an additional 30 minutes. The slurry was poured into a TEFLON lined container, sealed and let stand at room temperature for 3 days. The container was then placed in an oven at 100° C. for 18 days. At the end of the aforementioned period the container was removed from the oven, cooled to room temperature and the solid product recovered by filtration. The solid product was washed with distilled water until the pH of the filtrate was less than pH 8. The solid product was dried at room temperature in air for several days.

The above product (ZSM-20) was then characterized by X-ray analysis. In addition, a zeolite Y (sodium form) having a $SiO_2/Al_2O_3$ ratio of about 4.7 was characterized by X-ray analyses. The X-ray patterns of these two samples are set forth below. Further and for comparison purposes, the X-ray diffraction pattern of example 1 of U.S. Pat. No. 3,972,983 and Table A of U.S. Pat. No. 3,130,007 (zeolite Y) are set forth below.

| Example 1 of U.S. Pat. No. 3,972,983 | ZSM-20 (Prepared) | Table A of U.S. Pat. No. 3,130,007 | NaY |
|---|---|---|---|
|  | 16.82 |  |  |
| 14.85 | 14.92 |  |  |
| 14.23 | 14.13 | 14.37–14.15 | 14.24 |
| 11.87 |  |  |  |
| 10.92 |  |  |  |
| 8.66 | 8.67 | 8.80–8.67 | 8.72 |
| 8.19 |  |  |  |
| 7.66 |  |  |  |
| 7.42 | 7.40 | 7.50–7.39 | 7.44 |
| 5.85 |  |  | 6.87 |
| 5.64 | 5.64 | 5.71–5.62 | 5.66 |
| 5.31 |  |  |  |
| 5.18 |  |  |  |
| 4.97 |  |  | 5.02 |
| 4.85 |  |  |  |
| 4.72 | 4.72 | 4.79–4.72 | 4.75 |
| 4.43 |  | 4.46–4.33 |  |
| 4.34 | 4.34 | 4.29–4.16 | 4.38 |
| 4.15 |  | 4.13–4.09 | 4.17 |
| 3.97 |  | 3.93–3.88 | 3.90 |
| 3.82 | 3.82 |  |  |
| 3.75 | 3.75 | 3.79–3.74 | 3.76 |
| 3.63 |  | 3.66–3.62 |  |
| 3.58 |  |  |  |
| 3.53 |  |  | 3.56 |
| 3.44 | 3.45 | 3.48–3.43 | 3.46 |
| 3.32 |  | 3.33–3.28 | 3.30 |
| 3.28 | 3.28 |  |  |
| 3.19 | 3.20 |  | 3.21 |
| 3.11 |  |  |  |
| 3.03 |  | 3.04–3.00 | 3.02 |
| 3.00 | 3.00 |  |  |
| 2.94 |  |  | 2.96 |
| 2.89 | 2.90 | 2.91 |  |
| 2.86 | 2.87 | 2.87–2.83 | 2.85 |
| 2.84 | 2.84 |  |  |

Attempts to index the X-ray diffraction data from U.S. Pat. No. 3,972,983 by assuming a hexagonal unit cell were not successful. Further, when the X-ray diffraction data from ZSM-20 in Example 1 of the patent were used, such do not make crystallographic sense when a hexagonal cell is assumed for ZSM-20. An alternative explanation of the X-ray diffraction data of U.S. Pat. No. 3,972,983 could be that ZSM-20 is a mixture of two or more zeolites. The X-ray diffraction data of the ZSM-20 sample prepared above was then compared with the X-ray data of Table A of U.S. Pat. No. 3,130,007. As shown by the above data, ZSM-20 contains a number of lines with d(A) spacings similar to the synthetic faujasite of U.S. Pat. No. 3,130,007, but the synthetic faujasite lacks at least the major reflection at 14.92 Å which is the second most significant line for ZSM-20. Similarly, the distinction between ZSM-20 and the zeolite Y of U.S. Pat. No. 3,306,922 has been recognized in the affidavit of George T. Kokotailo filed during the prosecution of the application which issued as U.S. Pat. No. 3,972,983.

The ZSM-20 product prepared above was evaluated by selected area election diffraction. The ZSM-20 crystals were not visually observed to be a mixture and had a hexagonal morphology. However, the electron diffraction patterns from the crystals were only pseudo-hexagonal and the actual symmetry of the ZSM-20 crystals is probably orthorombic. Nevertheless, the above data show that ZSM-20 does not have a cubic symmetry and does not have the morphology characteristic of faujasite.

EXAMPLE 18

(a) The properties of LZ-210 were evaluated for ion-exchange. The ion-exchange properties of "Ultrastable Y" zeolites having comparable silica to alumina ratios were also evaluated for their ion-exchange properties. Two zeolites were prepared for evaluation of their ion-exchange properties for $Cs^+$ cations. An ultrastable Y zeolite was prepared according to the procedure disclosed in the article by McDaniel, C. V. and Maher, P. K., *Molecular Sieves*, Society of Chemical Industry, London, page 186 (1968). The $SiO_2/Al_2O_3$ ratio of the framework of the ultrastable Y was determined by the procedure described in the article by Maher, P. K., Hunter, F. D. and Scherzer, J., *Molecular Sieve Zeolites,* Advans. Chem. Series, 101, ACS Washington, D.C. page 201 (1971). The $SiO_2Al_2O_3$ ratio of the ultrastable Y was determined to be 6.0. LZ-210 was prepared according to the instant invention and the $SiO_2/Al_2O_3$ ratio determined to be 6.5.

(b) Samples of the ultrastable Y and LZ-210 prepared in part (a) were evaluated by employing such to treat CsCl solutions. The amount of CsCl was selected to provide sufficient $Cs^+$ cations to exchange 100% of the total cation exchange sites. The total cation sites for exchange purpose are assumed to be equal to the number of aluminum atoms present in the zeolite sample, i.e., each cation associates with an aluminum to balance charge. The ultrastable Y and LZ-210 were each slurried with aqueous CsCl solutions for 30 minutes at 22° C. The slurries were then filtered and the solids washed with water. Chemical analyses of the starting slurries, the solid products and the filtrates gave the following results:

|  | Ultrastable Y | LZ-210 |
|---|---|---|
| Initial CsCl Solution: |  |  |
| $H_2O$ (ml.): | 100 | 100 |
| Zeolite (anhyrous wt. in grams): | 1.00 | 1.00 |
| % $Cs^+$ (weight in grams): | 0.485 | 0.486 |
| Filtrate: |  |  |
| $Cs^+$ (weight in grams): | 0.444 | 0.223 |
| $Cs_2O$ removed (wt. %) | 8.4 | 54.1 |
| Solid Product: |  |  |
| $Cs_2O$ (wt. %): | 1.0 | 16.6 |
| % $Cs^+$ exchanged: | 1.6 | 50.0 |

The above data demonstrates the significant differences between ultrastable Y and LZ-210. Whereas ultrastable Y has a % $Cs^+$ exchange of 1.6 the % $Cs^+$ exchange for LZ-210 was 50.0 Since approximately 30% of the exchange sites of zeolite Y (faujasite) are not available to $Cs^+$ cations as a result of its ionic radius of about 3.6 to 3.8 Angstroms, the % $Cs^+$ exchange of LZ-210 corresponds to a 70% exchange of available cation sites whereas the % $Cs^+$ exchange of 1.6 for ultrastable Y corresponds to a 2.3% exchange of (c) Samples of the ultrastable Y and LZ-210 prepared in part (a) were evaluated by the procedure of part (b), except the amount of CsCl was selected to provide sufficient Cs+ cations to exchange 50% of the total cation exchange sites. Chemical analysis of the starting slurries, the solid products and the filtrates gave th following results:

|  | Ultrastable Y | LZ-210 |
|---|---|---|
| Initial CsCl Solution: |  |  |
| H$_2$O (ml.): | 100 | 100 |
| Zeolite (anhydrous wt. in grams): | 1.00 | 1.00 |
| Cs+ (weight in grams): | 0.269 | 0.268 |
| Filtrate: |  |  |
| Cs+ (weight in grams): | 0.217 | 0.068 |
| % Cs+ removed (wt. %): | 19.3 | 74.6 |
| Solid Product: |  |  |
| Cs$_2$O (wt. %): | 0.7 | 10.7 |
| % Cs+ exchanged: | 1.2 | 30.4 |

The above data demonstrates that while only 1.7 percent of the availabe cation sites of ultrastable Y were exchanged that 43 percent of the available cation sites of LZ-210 were exchanged with Cs+. This dramatic difference in the ion exchange capacity between ultrastable Y and LZ-210 makes LZ-210 useful for a myraid of applications involving ion exchange and makes LZ-210 useful in catalysts where the zeolite component is desirably ion exchanged prior to or after incorporation in the catalyst. The importance of the above identified ion exchange differences between ultrastable Y and LZ-210 is evident to those involved in the preparations of adsorbent and catalyst compositions.

What is claimed is:

1. Process for hydrocarbon conversion which comprises contacting a hydrocarbon under converting conditions with a crystalline zeolitic aluminosilicate having at least some of its original framework aluminum atoms replaced by extraneous silicon atoms and having the chemical composition $$[Al_{(a-N)}Si_{b+(N-\Delta z)}\square_z]O_2$$

wherein Al$_{(a-N)}$ represents the mole fraction of aluminum tetrahedra; "a" represents the mole fraction of aluminum tetrahedra in the original zeolite; "N" represents the mole fraction of aluminum tetrahedra removed from the original zeolite, and has a value of at least 0.3a; Si$_{b+(N-\Delta z)}$ represents the mole fraction of silicon tetrahedra; "b" represents the mole fraction of silicon tetrahedra in the original zeolite; (N−Δz) represents the mole fraction of silicon tetrahedra resulting from the substitution of extraneous silicon into the crystal lattice; "z" represents the difference in the Defect Structure Factor between the original zeolite and the zeolite containing the extraneous silicon atoms and has a value of less than 0.08;

$$\left(\frac{N-\Delta z}{N}\right)$$

has a value at least as great as 0.5; z represents the mole fraction of defect sites;

$$\frac{b+(N-\Delta z)}{a-N}$$

has a value of at least 4.0; has a cation equivalent expressed as a monovalent cation species, M+/Al of from 0.85 to 1.1; and having an x-ray powder diffraction pattern containing at least the d-spacings set forth in Table C.

2. Process according to claim 1 wherein the hydrocarbon conversion process is catalytic cracking.

3. Process according to claim 1 wherein the hydrocarbon conversion process if hydrocracking.

4. Process according to claim 1 wherein the hydrocarbon conversion process is alkylation.

5. Process according to claim 1 wherein the hydrocarbon conversion process is isomerization.

6. Process according to claim 1 wherein the hydrocarbon conversion process is hydrofining.

7. Process according to claim 1 wherein the hydrocarbon conversion process is reforming.

8. Process according to claim 1 wherein the hydrocarbon conversion process is catalytic dewaxing.

9. Process according to claim 5 wherein the hydrocarbon conversion process is xylene isomerization.

10. Process for catalytic hydrocarbon conversion which comprises contacting a hydrocarbon under hydrocarbon converting conditions with a crystalline zeolitic aluminosilicate having at least some of its original framework aluminum atoms replaced by extraneous silicon atoms and having a mole ratio of oxides in the anhydrous state of $$(0.85-1.1)M_{2/n}O:Al_2O_3:xSiO_2$$

wherein M is a cation having a valence of "n"; "x" has a value greater than 6.0; has a X-ray powder diffraction pattern having at least the d-spacings of Table A; and has extraneous silicon atoms in the crystal latticce in the form of framework SiO$_4$ tetrahedra.

11. Process for catalytic hydrocarbon conversion which comprises contracting a hydrocarbon under hydrocarbon converting conditions with a crystalline zeolitic aluminosilicate having at least some of its original framework aluminum atoms replaced by extraneous silicon atoms and having the chemical composition $$[Al_{(a-N)}Si_{b+(N-\Delta z)}\square_z]O_2$$

wherein Al$_{(a-N)}$ represents the mole fraction of aluminum tetrahedra; "a" represents the mole fraction of aluminum tetrahedra in the original zeolite; "N" represents the mole fraction of aluminum tetrahedra removed from the original zeolite; Si$_{b+(N-\Delta z)}$ represents the mole fraction of silicon tetrahedra; "b" represents the mole fraction of silicon tetrahedra in the original zeolite; (N−Δz) represents the mole fraction of silicon tetrahedra resulting from the substitution of extraneous silicon into the crystal lattice; "Δz" represents the difference in the Defect Structure Factor between the original zeolite and the zeolite containing the extraneous silicon atoms and has a value of less than 0.08;

$$\frac{(n-\Delta z)}{N}$$

has a value at least 0.5; "□" represents defect sites; z $$\frac{b+(N-\Delta z)}{(a-N)}$$

has a value greater than 3.0; and has an x-ray power diffraction patten having at least the d-spacings of Table A.

12. Process according to claim 10 or claim 11 wherein the hydrocarbon conversion process is catalytic cracking.

13. Process according to claim 10 or claim 11 wherein the hydrocarbon conversion process is hydrocracking.

14. Process according to claim 10 or claim 11, wherein the hydrocarbon conversion process is alkylation.

15. Process according to claim 10 or claim 11 wherein the hydrocarbon conversion process is isomerization.

16. Process according to claim 10 or claim 11 wherein the hydrocarbon conversion process is hydrofining.

17. Process according to claim 10 or claim 11 wherein the hydrocarbon process is reforming.

18. Process according to claim 10 or claim 11 wherein the hydrocarbon conversion process is catalytic dewaxing.

19. Process according to claim 15 wherein the hydrocarbon conversion process is xylene isomerization.

* * * * *